(12) United States Patent
Moriau et al.

(10) Patent No.: US 7,040,068 B2
(45) Date of Patent: May 9, 2006

(54) FLOOR PANELS WITH EDGE CONNECTORS

(75) Inventors: Stefan Simon Gustaaf Moriau, Gent (BE); Mark Gaston Maurits Cappelle, Staden (BE); Bernard Paul Joseph Thiers, Oostrozebeke (BE)

(73) Assignee: Unilin Beheer B.V., besloten vennootschap, Ijssel (NL)

( * ) Notice: Subject to any disclaimer, the term of this patent is extended or adjusted under 35 U.S.C. 154(b) by 182 days.

(21) Appl. No.: 10/256,183

(22) Filed: Sep. 27, 2002

(65) Prior Publication Data

US 2003/0024200 A1 Feb. 6, 2003

Related U.S. Application Data

(63) Continuation of application No. 09/471,014, filed on Dec. 23, 1999, now Pat. No. 6,490,836, which is a continuation of application No. 08/872,044, filed on Jun. 10, 1997, now Pat. No. 6,006,486.

(30) Foreign Application Priority Data

Jun. 11, 1996 (BE) ............................................. 09600527
Apr. 15, 1997 (BE) ........................................... 09700344

(51) Int. Cl.
*E04B 2/46* (2006.01)

(52) U.S. Cl. ..................... 52/591.3; 52/586.1; 52/590.2; 52/592.2

(58) Field of Classification Search ................ 52/403.1, 52/480, 588.1, 582.1, 586.1, 592.1, 592.4, 52/591.3, 590.2, 578; 403/364, 375, 381
See application file for complete search history.

(56) References Cited

U.S. PATENT DOCUMENTS

| 753,791 A | 3/1904 | Fulghum |
|---|---|---|
| 1,124,228 A | 1/1915 | Houston |
| 1,986,739 A | 1/1935 | Mitte |

(Continued)

FOREIGN PATENT DOCUMENTS

| AU | A 13098/83 | 10/1983 |
|---|---|---|
| BE | 417526 | 9/1936 |
| BE | 557844 | 5/1957 |

(Continued)

OTHER PUBLICATIONS

Abgustaff Kahr Opposition Against Unilin European Patent No. EP 0 843 763 (Jun. 29, 2001).
Akzenta Brief (Arguments) in Support of Intervention in Opposition Against Unilin European Patent Application No. 00201515.4 (Including Partial Translation of Document E2 Cited Therein) (Oct. 10, 2001).

(Continued)

*Primary Examiner*—Carl D. Friedman
*Assistant Examiner*—Yvonne M. Horton
(74) *Attorney, Agent, or Firm*—Bacon & Thomas PLLC

(57) ABSTRACT

Floor covering, including hard floor panels which, at least at the edges of two opposite sides, are provided with coupling parts, cooperating which each other, substantially in the form of a tongue and a groove, wherein the coupling parts are provided with integrated mechanical locking elements which prevent the drifting apart of two coupled floor panels in a direction (R) perpendicular to the related edges and parallel to the underside of the coupled floor panels, and provide a snap-action coupling.

57 Claims, 10 Drawing Sheets

U.S. PATENT DOCUMENTS

| | | | |
|---|---|---|---|
| 1,988,201 A | | 1/1935 | Hall |
| 2,276,071 A | | 3/1942 | Scull |
| 2,430,200 A | | 11/1947 | Wilson |
| 2,740,167 A | | 4/1956 | Rowley |
| 3,045,294 A | | 7/1962 | Livezey, Jr. |
| 3,267,630 A | | 8/1966 | Omholt |
| 3,310,919 A | | 3/1967 | Bue et al. |
| 3,387,422 A | | 6/1968 | Wanzer |
| 3,526,420 A | | 9/1970 | Brancaleone |
| 3,538,665 A | | 11/1970 | Gall |
| 3,694,983 A | | 10/1972 | Couquet |
| 3,731,445 A | | 5/1973 | Hoffmann et al. |
| 3,759,007 A | | 9/1973 | Thiele |
| 3,859,000 A | | 1/1975 | Webster |
| 4,164,832 A | | 8/1979 | Van Zandt |
| 4,169,688 A | | 10/1979 | Toshio |
| 4,426,820 A | * | 1/1984 | Terbrack et al. ............ 52/594 |
| 4,501,102 A | | 2/1985 | Knowles |
| 4,641,469 A | | 2/1987 | Wood |
| 4,738,071 A | | 4/1988 | Ezard |
| 4,769,963 A | | 9/1988 | Meyerson |
| 4,819,932 A | | 4/1989 | Trotter |
| 5,029,425 A | | 7/1991 | Bogataj |
| 5,179,812 A | | 1/1993 | Hill |
| 5,216,861 A | | 6/1993 | Meyerson |
| 5,295,341 A | * | 3/1994 | Kajiwara ................. 52/586.2 |
| 5,349,796 A | | 9/1994 | Meyerson |
| 5,502,939 A | | 4/1996 | Zadok et al. |
| 5,630,304 A | | 5/1997 | Austin |
| 5,706,621 A | * | 1/1998 | Pervan ................... 52/403.1 |
| 5,768,850 A | | 6/1998 | Chen |
| 5,797,175 A | | 8/1998 | Schneider |
| 5,797,237 A | | 8/1998 | Finhell, Jr. |
| 5,860,267 A | | 1/1999 | Pervan |
| 6,023,907 A | | 2/2000 | Pervan |
| 6,029,416 A | * | 2/2000 | Andersson .............. 52/592.1 |
| 6,182,410 B1 | * | 2/2001 | Pervan ................... 52/403.1 |
| 6,588,166 B1 | * | 7/2003 | Martensson et al. ......... 52/578 |
| 2002/0020127 A1 | * | 2/2002 | Theirs et al. ............ 52/403.1 |
| 2003/0033777 A1 | * | 2/2003 | Theirs et al. .............. 52/390 |

FOREIGN PATENT DOCUMENTS

| | | |
|---|---|---|
| CA | 991373 | 6/1976 |
| CH | 200949 | 11/1938 |
| CH | 211877 | 10/1940 |
| CH | 562 377 | 4/1975 |
| DE | 1212275 | 3/1966 |
| DE | 1 534 802 | 4/1970 |
| DE | 7102476 | 1/1971 |
| DE | 1534278 | 11/1971 |
| DE | 2238600 | 2/1974 |
| DE | 7402354 | 5/1974 |
| DE | 2502992 | 7/1976 |
| DE | 2616077 | 10/1977 |
| DE | 2917025 | 11/1980 |
| DE | 3041781 | 6/1982 |
| DE | 3246376 | 6/1984 |
| DE | 3343601 | 6/1985 |
| DE | 8604004 | 6/1986 |
| DE | 3512204 | 10/1986 |
| DE | 3544845 | 6/1987 |
| DE | 4215273 | 11/1993 |
| DE | 4242530 | 6/1994 |
| EP | 0248127 | 12/1987 |
| EP | 0 667 936 B2 | 7/2000 |
| FR | 424057 | 2/1935 |
| FR | 1293043 | 11/1962 |
| FR | 2568295 | 1/1986 |
| FR | 2630149 | 10/1989 |
| FR | 2675174 | 10/1992 |
| FR | 2691491 | 11/1993 |
| FR | 2697275 | 4/1994 |
| GB | 1127915 | 9/1968 |
| GB | 1237744 | 6/1971 |
| GB | 1275511 | 5/1972 |
| GB | 1430423 | 3/1976 |
| GB | 2117813 | 10/1983 |
| GB | 2243381 | 10/1991 |
| GB | 2256023 | 11/1992 |
| JP | 54-65528 | 5/1979 |
| JP | 57-119056 | 7/1982 |
| JP | 3-169967 | 7/1991 |
| JP | 5-148984 | 6/1993 |
| JP | 6-146553 | 5/1994 |
| JP | 6-200611 | 7/1994 |
| JP | 6-56310 | 8/1994 |
| JP | 6-320510 | 11/1994 |
| JP | 7-076923 | 3/1995 |
| JP | 07180333 | 7/1995 |
| JP | 7-300979 | 11/1995 |
| JP | 7-310426 | 11/1995 |
| JP | 8-109734 | 4/1996 |
| JP | 8-270193 | 11/1996 |
| NL | 76 01773 | 8/1976 |
| SE | 372051 | 12/1974 |
| SE | 450141 | 5/1987 |
| SE | 501014 | 10/1994 |
| SE | 502994 | 3/1996 |
| WO | WO 84/02155 | 6/1984 |
| WO | WO 93/13280 | 7/1993 |
| WO | WO 94/01628 | 1/1994 |
| WO | WO 94/01688 | 1/1994 |
| WO | WO 94/26999 | 11/1994 |
| WO | WO 96/27719 | 9/1996 |
| WO | WO 96/27721 | 9/1996 |

OTHER PUBLICATIONS

EFP Floor Products Opposition Against Unilin European Patent No. EP 0 843 763 (Oct. 27, 2000).

Hornitex–Werke Opposition to Unilin European Patent No. 0 843 763 (Jul. 4, 2001).

Kronospan Action to Nullify Unilin German Utility Model Patent No. 297 24 428 U1, including Cited Documents E2 (with Partial Translation); E3; E5 and E6 (with Translation) (Aug. 9, 2001).

Kronospan Opposition Against Unilin European Patent No. EP 0 843 763 (Jul. 14, 2001).

Kronotex Arguments in Appeal from Decision of Germany Patent Court Upholding Validity of Unilin German Utility Model Patent No. DE–UM 29 710 175 (Jul. 17, 2000).

Kronotex Arguments filed before Federal Patent Court in Appeal from Adverse Decision of German Patent Office Upholding Validity on Unilin German Utility Model Patent No. DE–UM 297 10 175 (Jul. 24, 2001).

Kronontex Opposition Against Unilin Australian Patent Application No. 713,628 AU–B (32569/97) (Sep. 1, 2000).

Kronotex Opposition Against Unilin European Patent No. EP 0 843 763 (Jun. 29, 2001).

Observations by Third Party (Kandl) Regarding Patentability of Unilin European Patent Application No. 00201515.4 (including Partial Translation of Document E2 Cited Therein) (Oct. 10, 2001).

Observations of M. Kandl submitted in European patent application No. 00201515.4 of Unilin Beheer, Oct. 18, 2001.

Observations of M. Kandl submitted in European patent application No. 00201515.4 of Unilin Beheer, Dec. 18, 2001.

Observations of M. Kandl submitted in European patent application No. 00201515.4 of Unilin Beheer, Jan. 14, 2002.
Observations of M. Kandl submitted in European patent application No. 00201515.4 of Unilin Beheer, Jan. 24, 2002.
"Selbst Teppichböden, PVC und Parkett verlegen", 1985 Compact Verlag München.
Valinge Aluminum Observations Regarding Unilin European Patent No. EP 0 83 763 (Nov. 19, 1998).
Valinge Aluminum Opposition Against Unilin Australia Patent No. 713 628 (AU–B 325 60/97) (Jun. 6, 2000).
Valinge Aluminum Opposition Against Unilin New Zealand Patent 3,29,581 (Jun. 2000).
Valinge Aluminum Opposition Against Unilin European Patent No. EP 0 843 763 with Copies of Cited Documents (Aug. 6, 2001).
*Webster's Dictionary*, definition of "scarf", p. 862, 1992, PAMCO Publ. Comp. Inc. (N.Y.).

Judgment of British Patents County Court in Patent infringement Action PAT Nos. 02010 and 02014 involving British Patent No. EP (UK) 1 024 034 of Unilin Beheer, Sep. 25, 2003.
Expert Report of Dr. Hugh David Mansfield–Williams in British Patents County Court cases PAT 02010 and 02014, signed Jul. 7, 2003.
Expert Report of Mark Anthony Irle, signed Jul. 7, 2003, with Bundle BA (Exhibits to report).
Notification from German PTO regarding utility model revocation proceedings against Unilin Beheer B.V. utility model No. 297 24 428 (Apr. 7, 2003), (with translation).
"Decision of Opposition Division of European Patent Office regarding EP 1 024 234 of Unilin Beheer N.V., mailed Jul. 18, 2004."

\* cited by examiner

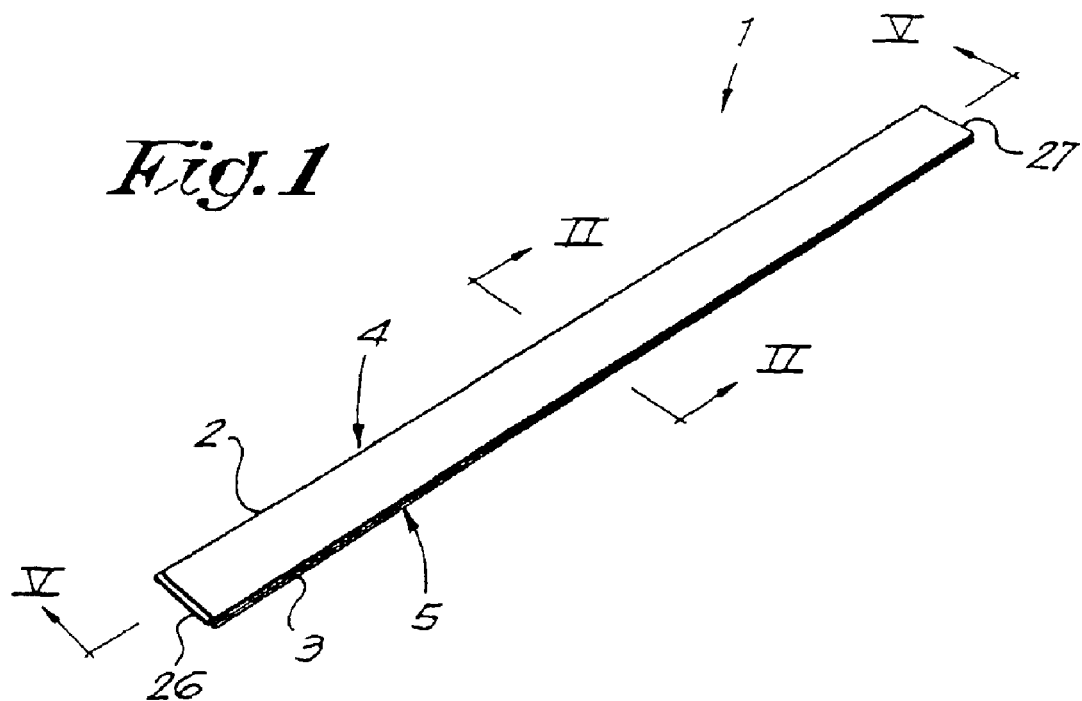
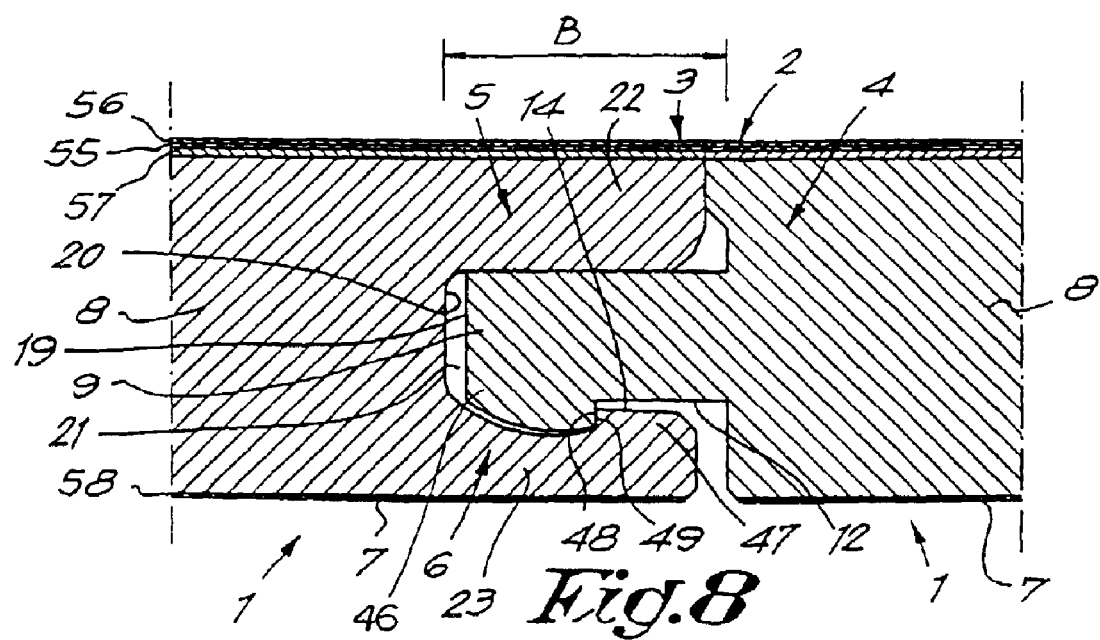

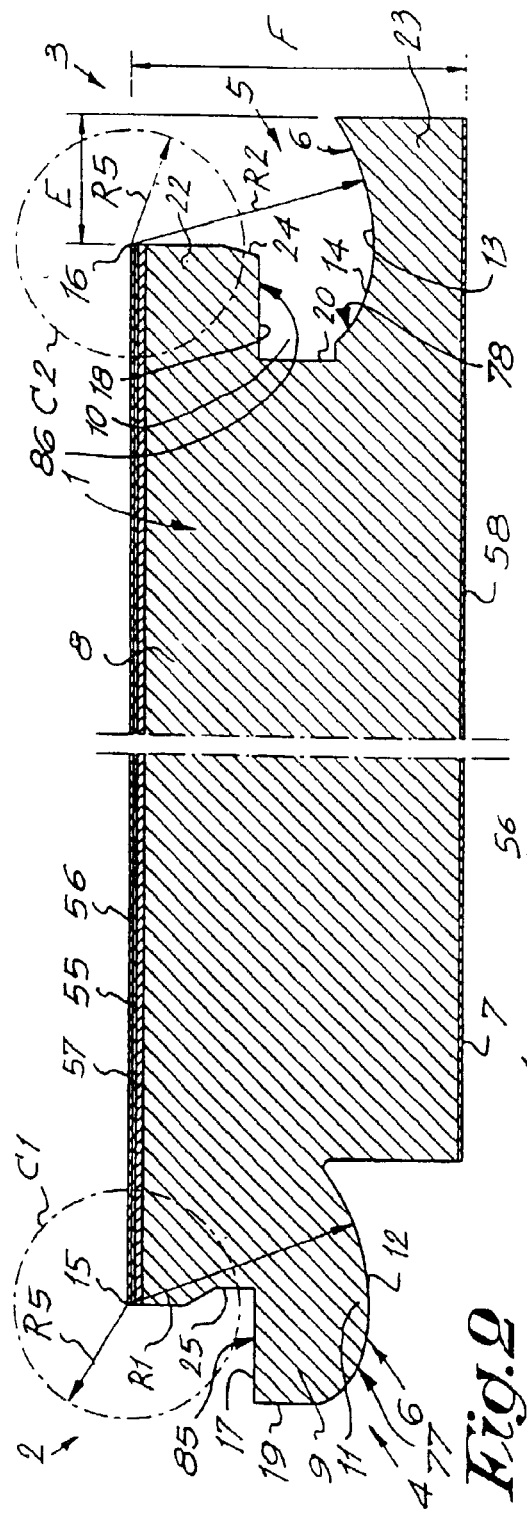

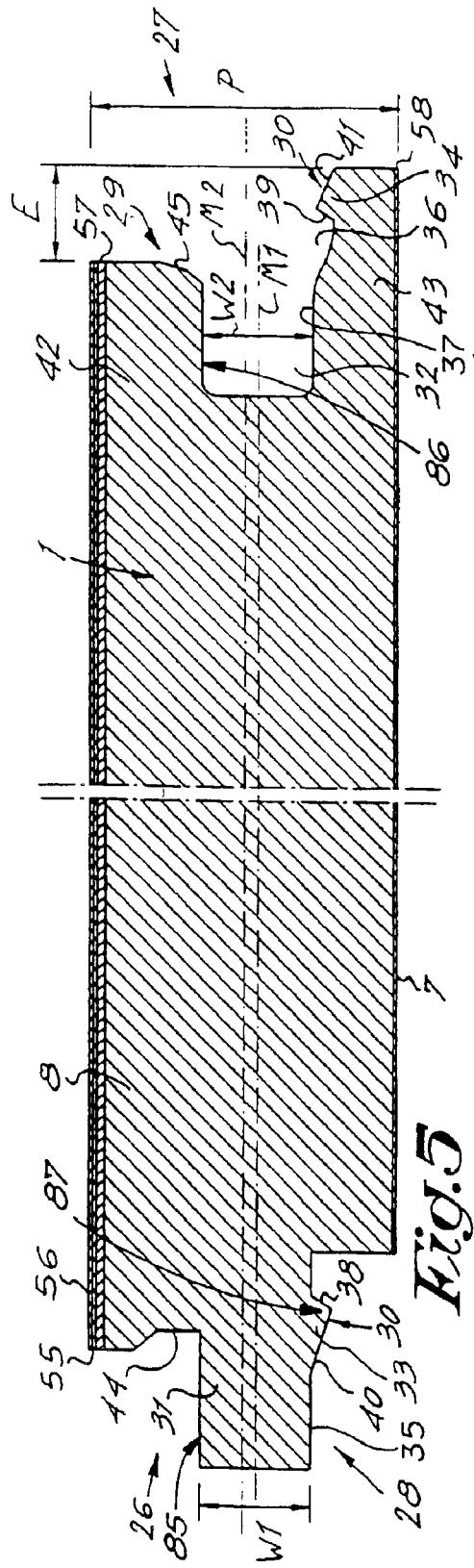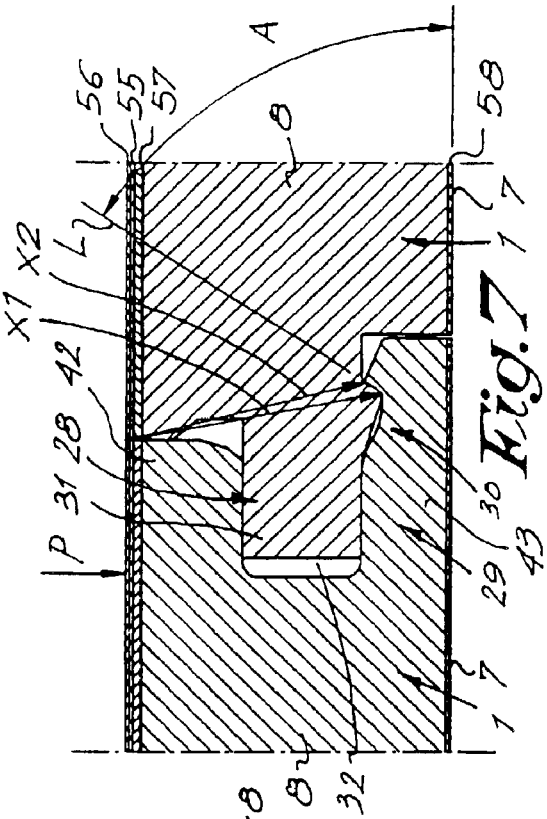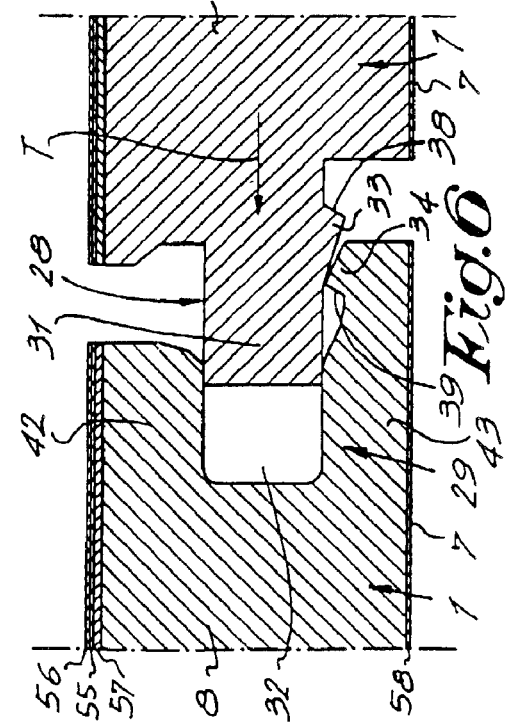

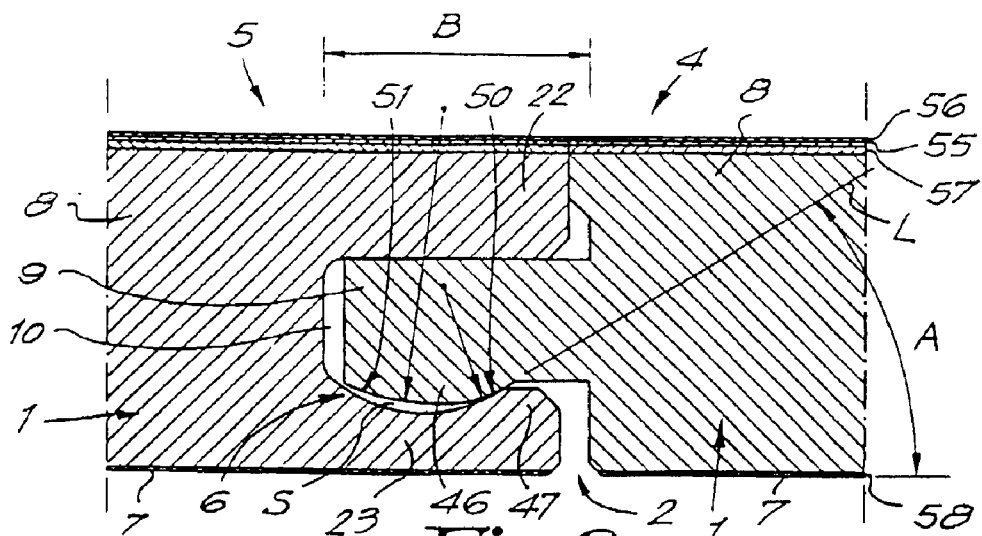
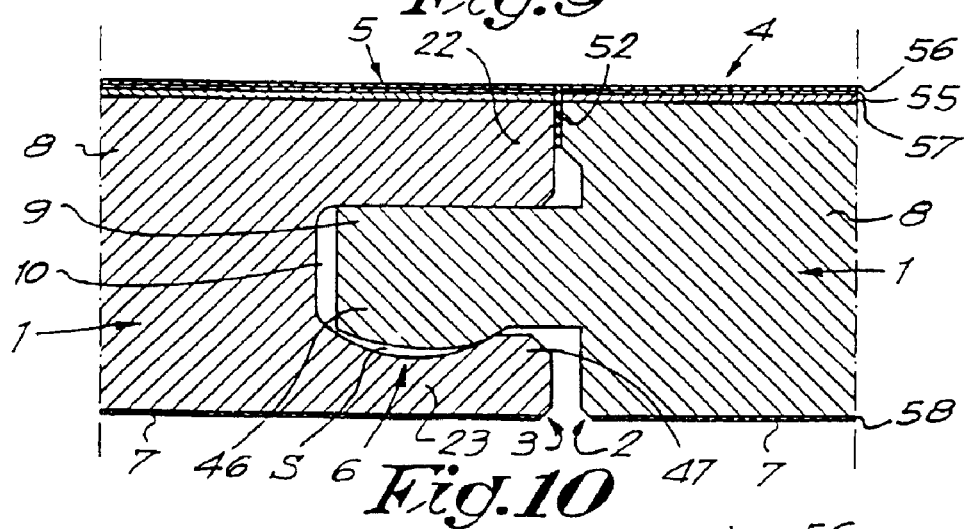
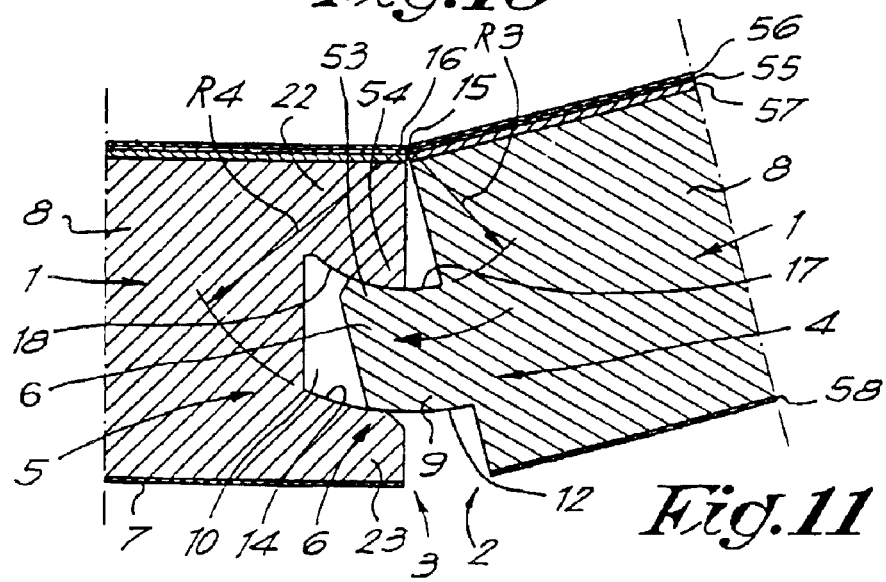

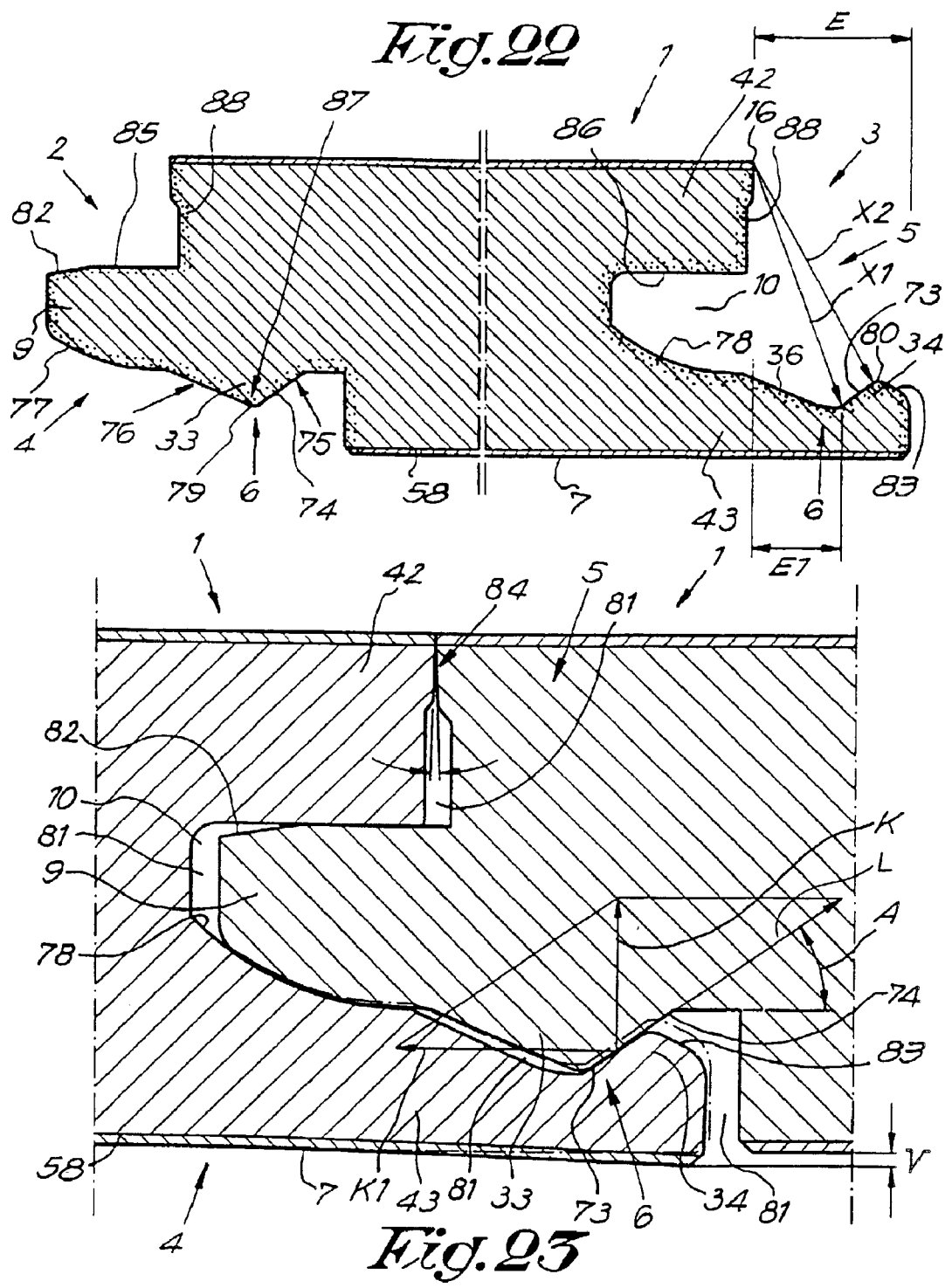

FLOOR PANELS WITH EDGE CONNECTORS

RELATED APPLICATION DATA

This application is a continuation of application Ser. No. 09/471,014, filed Dec. 23, 1999 now U.S. Pat. No. 6,490,836; which is a continuation of application Ser. No. 08/872,044 filed Jun. 10, 1997, now U.S. Pat. No. 6,006,486.

BACKGROUND OF THE INVENTION

1. Field of the Invention

This invention relates to a floor covering made of hard floor panels.

2. Related Technology

In the first instance, the invention is intended for so-called laminated floors, but generally it can also be applied for other kinds of floor covering, consisting of hard floor panels, such as veneer parquet, prefabricated parquet, or other floor panels which can be compared to laminated flooring.

It is known that such floor panels can be applied in various ways.

According to a first possibility, the floor panels are attached at the underlying floor, either by glueing or by nailing them on. This technique has a disadvantage that is rather complicated and that subsequent changes can only be made by breaking out the floor panels.

According to a second possibility, the floor panels are installed loosely onto the subflooring, whereby the floor panels mutually match into each other by means of a tongue and groove coupling, whereby mostly they are glued together in the tongue and groove, too. The floor obtained in this manner, also called a floating parquet flooring, has as an advantage that it is easy to install and that the complete floor surface can move which often is convenient in order to receive possible expansion and shrinkage phenomena.

A disadvantage with a floor covering of the above-mentioned type, above all, if the floor panels are installed loosely onto the subflooring, consists in that during the expansion of the floor and its subsequent shrinkage, the floor panels themselves can drift apart, as a result of which undesired gaps can be formed, for example, if the glue connection breaks.

In order to remedy this disadvantage, techniques have already been through of whereby connection elements made of metal are provided between the single floor panels in order to keep them together. Such connection elements, however, are rather expensive to make and, furthermore, their provision or the installation thereof is a time-consuming occupation.

Examples of embodiments which apply such metal connection elements are described, among others, in the documents WO 94/26999 and WO 93/13280.

Furthermore, couplings are known which allow coupling parts to snap fit into each other. e.g., from the documents U.S. Pat. No. 5,295,341, WO 96/27719 and 96/27721. The snapping-together effect obtained with these forms of embodiment, however, does not guarantee a 100-percent optimum counteraction against the development of gaps between the floor panels, more particularly, because in fact at least in WO 96/27719 well-defined plays have to be provided in order to be sure that the snapping-together is possible.

From GB 424.057, a coupling for parquetry parts is known which, in consideration of the nature of the coupling, only is appropriate for massive wooden parquetry.

Furthermore, there are also couplings for panels known from the documents GB 2.117.813, GB 2,256.023 and DE 3.544.845. These couplings, however, are not appropriate for connecting floor panels.

BRIEF SUMMARY OF THE INVENTION

The invention aims at an improved floor covering of the aforementioned type, the floor panels of which can be coupled to each other in an optimum manner and/or the floor panels of which can be manufactured in a smooth manner, and whereby preferably one or more of the aforementioned disadvantages are excluded.

The invention also aims at a floor covering which has the advantage that no mistakes during installing, such as gaps and such, can be created.

Furthermore, the invention also aims at a floor covering whereby the subsequent development of gaps is excluded or at least counteracted in an optimum manner, whereby also the possibility of the penetration of dirt and humidity is minimalized.

To this aim, the invention relates to a floor covering, consisting of hard floor panels which, at least at the edges of the two opposite sides, are provided with coupling parts, cooperating which each other, substantially in the form of a tongue and a groove, wherein the coupling parts are provided with integrated mechanical locking elements which prevent the drifting apart of two coupled floor panels into a direction perpendicular to the related edges and parallel to the underside of the coupled floor panels. Hereby, these coupling parts are optimalized in such a manner that they allow that any form of play is counteracted and preferably is excluded.

By integrated mechanical locking elements is understood that these form a fixed part of the floor panels, either by being connected in a fixed manner to the floor panels, or by being formed in one piece therewith.

In a first important preferred form of embodiment, the coupling parts are provided with locking elements which, in the engaged position of two or more of such floor panels, exert a tension force upon each other which force the floor panels towards each other. As a result of this that not only the formation of gaps counteracted during installation, but also in a later stage the development of gaps, from any causes whatsoever, is counteracted.

According to another characteristic of the intention, the coupling parts, hereby are formed in one piece with the core of the floor panels.

According to a second important preferred embodiment, the aforementioned optimalization is achieved in that the floor covering panel possesses the following combination of characteristics: the coupling parts and locking elements are formed in one piece with the core of the floor panels; the coupling parts have such a shape that two subsequent floor panels can be engaged into each other exclusively by snapping together and/or turning, whereby each subsequent floor panel can be inserted laterally into the previous; the coupling parts are interlocked free from play in all directions in a plane extending perpendicular to the aforementioned edges; the possible difference between the upper and lower lip of the lips which border the aforementioned grooves, measured in the plane of the floor panel and perpendicular to the longitudinal direction of the groove, is smaller than one time the total of the thickness of the panel; the total thickness of each related floor panel is larger than or equal to 5 mm; and that the basic material of the floor panels, of which the aforementioned core and locking elements are formed, consists of a ground product which, by means of a binding agent or by means of melting together, is made into a unitary composite, and/or of a product on the basis of synthetic material and/or of a chip board with fine chips.

Due to the fact that the coupling parts provide for an interlocking free from play, as well as due to the fact that these coupling parts are manufactured in one piece, from the basic material of the floor panels, a perfect connection between adjacent floor panels can always be guaranteed, even with repeated expansion and shrinkage of the floor surface.

This combination of characteristics can be combined or not with the aforementioned characteristic that the locking elements exert a tension force upon each other when panels are joined together.

According to a third important preferred embodiment, the characteristics of which may or may not be combined with the characteristics of the embodiments described above, the floor covering is characterized in that the lower lip which limits or defines the lower side of the groove, extends beyond the upper lip in the plane of the panel; the locking elements are formed at least of a contact portion which inwardly slopes downward; and that this portion, at least partially, is located in the portion of the lower lip which extends beyond the upper lip. The advantages of these features will appear from the further description.

According to a preferred form of embodiment, the floor panels are configured as elongated panels and the coupling parts described above are applied along the longitudinal sides of these panels.

According to a particular form of embodiment, coupling parts are provided at the other two sides, too, either of another construction than described above or not.

In the most preferred form of embodiment, for the basic material use shall be made of the aforementioned product, which, as said, is ground and, by means of a binding agent, made into a unitary composite material. More particularly, for the core use shall be made of finely-ground wood which preferably is glued, more particularly, moisture resistant glued. Still more particularly, for the core use shall be made of so-called HDF board (High Density Fibreboard) or MDF board (Medium Density Fibreboard) which is highly compressed ground wood particles (fibers) and binder material. Hereinafter, the wood component of the core material shall be referred to as "wood product ".

The fact that the invention is applied to floor panels the basic material of which consists of the material described above, offers the advantage that with the processing of this material, very smooth surfaces are obtained whereby very precise couplings can be realized, which, in first instance, is important in the case of a snap-together connection and/or turning connection free from play. Also, very special forms of coupling parts can be manufactured in a very simple manner because the aforementioned kinds of material can be processed particularly easy.

The surfaces obtained with HDF and MDF also have the advantage that the floor panels mutually can be shifted readily alongside each other in interlocked condition, even when engaged with a tensioning force.

The applicants also discovered that the aforementioned materials, in particular HDF and MDF, show ideal features in order to realize a connection, such as mentioned above, as these material show the right features in respect to elastic deformation in order to, on the one hand, realize a snap-together effect, and, on the other hand, receive expansion and shrinkage forces in an elastic manner, whereby it is avoided that the floor panels come unlocked or are damaged in an irreparable manner.

In the case that for the core use is made of a material based on synthetic material, to this end solid synthetic material can be used as well as a mixture of synthetic materials, eventually composed of recycled materials.

The floor covering preferably is formed by joining the floor panels into each other free of glue. Hereby, the connections are of such nature that the floor panels can be disassembled without being damaged, such that, for example, when moving from one residence or location to another, they can be taken along in order to be placed down again. It is, however, clear that a glueing between tongue and groove is not excluded.

The invention, of course, also relates to floor panels which allow the realization of the aforementioned floor covering.

The invention also relates to a method for the manufacturing of the aforementioned floor panels with which the advantage that the tongues and/or grooves, including the corresponding locking means, can be provided at the floor panels at high production speeds without problems. More particularly, it aims at a method which allows that the rather complicated forms of the tongue and the groove of the aforementioned floor panels can be formed completely by means of milling cutters, the diameter of which can be chosen independent of the form to be realized, such that the use of small milling cutters, for example finger cutters, with diameters smaller than the depth of the tongue or groove can be excluded.

In accordance with this method the tongue and/or groove is formed by means of a milling process using at least two sequential milling cycles or passes by means of milling cutters which are positioned at different angles in respect to the related floor panel. During each of the aforementioned milling cycles, preferably substantially the final form of one flank, either of the tongue or of the groove, is formed.

For the aforementioned two milling cycles, thus, milling cutters are used which extend outside the groove, respectively the tongue. More particularly the diameters of these milling cutters shall at least be 5 times and even better 20 times larger than the thickness of the floor panels.

The use of milling cutters having the aforementioned diameters has as an advantage that the normal production speeds can be maintained which are also applied during milling of a classical straight tongue and groove. There is also the advantage obtained that the installation of such milling cutters induce only minor or no additional costs because such milling cutters can be placed directly upon a motor shaft and/or the conventional machines can be used.

BRIEF DESCRIPTION OF THE DRAWINGS

With the intention of better showing the characteristics according to the invention, in the following, as an example without any limitative character, several preferred forms of embodiment are described, with reference to the accompanying drawings, wherein:

FIG. 1 represents a floor panel of a floor covering according to the invention;

FIG. 2, on a larger scale, represents a cross-section according to line II—II in FIG. 1;

FIGS. 3 and 4 represent how two floor panels with coupling parts according to FIG. 2 match into each other;

FIG. 5, on a larger scale, represents a cross-section according to line V—V in FIG. 1;

FIGS. 6 and 7 represent how two floor panels with coupling parts according to FIG. 5 match into each other;

FIGS. 8 to 11 represent a number of variants of coupling parts of floor panels according to the invention;

FIG. 22 represents a floor panel according to the invention;

FIG. 23, on a larger scale, represents the coupling of two floor panels of FIG. 22;

DETAILED DESCRIPTION

Figure 12:
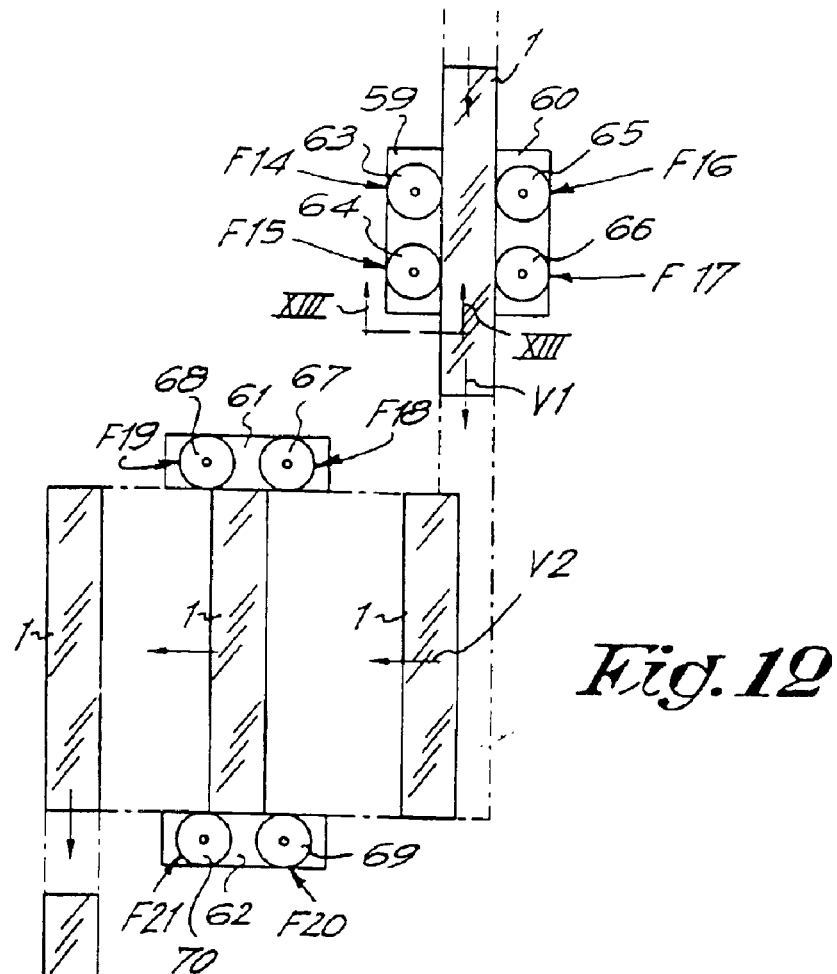
FIG. 12 schematically represents how the floor parts can be provided with coupling parts.

The invention relates to a floor covering which is composed of hard floor panels 1, for example, such as a laminated panel as shown in FIG. 1.

These floor panels 1 can be of various shape, for example, rectangular or square, or of any other shape.

In the most preferred form of embodiment, they shall be manufactured in an elongated form, such as shown in FIG. 1, for example, with a length of 1 to 2 meters. The thickness, however, can also vary, but is preferably 0.5 to 1.5 cm, and more particularly 0.8 cm.

Each floor panel 1 is, at least at the edges of two opposite sides 2–3, provided with coupling parts 4–5 which permit two adjacent identical floor panels 1 to be coupled to each other.

According to the invention, the coupling parts 4–5, as represented in the FIGS. 2 to 4, are provided with integrated mechanical locking parts or locking elements 6 which prevent the drifting or sliding apart of two coupled floor panels 1 in a direction D perpendicular to the respective sides 2–3 and parallel to the underside 7 of the coupled floor panels 1; the coupling parts 4–5 and the locking elements 6 are formed in one piece with the core 8 of the floor panels 1; the coupling parts 4–5 have such a shape that two subsequent floor panels 1 can be engaged into each other solely by snapping-together and/or turning after the coupling parts are partially engaged, whereby each subsequent floor panel 1 can be laterally inserted into the previous; and the coupling parts 4–5 preferably are interlocked free from play in all directions in a plane which is located perpendicular to the aforementioned edges.

In the case of floor panels 1 with an elongated shape, as represented in FIG. 1, the respective coupling parts 4–5 are located at the longitudinal sides 2–3.

The coupling parts 4–5 can be realized in various forms, although the basic forms thereof will always be formed by a tongue 9 and a groove 10.

In the form of embodiment of FIGS. 2 to 4, the related floor panel 1 is provided with coupling parts 4–5 and locking means or locking elements 6 which allow two floor panels 1 to be mutually engaged by means of a turning movement, without the occurrence of any snap-together effect.

In the represented example, the locking elements 6 consist of a first locking element 11, formed by a protrusion with a bent round shape at the lower side 12 of the tongue 9, and a second locking element 13 (shown in FIG. 2), formed by a recess with a bent hollow or downwardly concave shape in the lower wall 14 of the groove 10.

The locking elements 11–13 ensure that two floor panels 1 which are coupled to each other can not move laterally in the horizontal plane with respect to each other.

In order to enable two floor panels 1 to be inserted into each other by means of a turning movement, the curvatures preferably are circular. The bottom side 12 of locking means or locking elements 6 has a curvature with a radius R1, the center of which coincides with the respective upper edge 15 of the floor panel 1, whereas the lower wall 14 of the locking part 5 has a curvature with a radius R2 which is equal to the radius R1, but its center coincides with the respective upper edge 16. Radii R1 and R2 may also be applied which are larger or smaller than the distance to the upper edge 15, 16 respectively, and/or which differ from each other in size.

The upper side 17 of the tongue 9 and the upper wall or side 18 of the groove 10 are preferably flat and preferably are located in the horizontal plane.

The inner side 20 of the groove 10 and the front side 19 of the tongue 9 of the two interlocked floor panels 1 preferably do not fit closely against each other, such that an intermediate space 21 is created between them into which possible dust remainders or such can be pushed away by means of the tongue 9.

The tongue 9 and the groove 10 preferably have shapes which are complementary to each other, such that the tongue 9 in the engaged condition of two identical floor panels 1 precisely sits against the upper wall 18 and the lower wall 14 of the groove 10, whereby a pressure P, exerted against the upper lip 22, is received or reacted not only by this lip 22, but by the complete structure, because this pressure can be transmitted through the tongue 9 and the lower lip 23 to cause the panels to be urged towards each other.

It is, however, clear that a number of minor deviations to these complementary forms can occur which, anyhow, have no or almost no effect upon the receipt and transmission of pressure forces. For example, a chamfer 24 on lip 22 and a recess 25 can be provided, as represented in FIGS. 2 to 4, as a result of which the subsequent floor panels 1 can easily be pushed and guided into each other, such that no possible ridges in the subflooring or such render good insertion difficult.

As represented in the FIGS. 5 to 7, the floor panels 1 according to the invention can also, along the sides 26–27 which are at a right angle to the sides 2–3, be provided with coupling parts 28–29 which have locking elements 30, too. The coupling parts 28–29 are preferably also realized in the shape of a tongue 31 and a groove 32. Hereby, the locking elements 30 do not have to be of the same nature as the locking elements 6.

Preferably, at the sides 26–27 locking elements are provided which allow for an engagement and interlocking by means of a lateral translation movement in direction T only, as represented in FIGS. 6 and 7. To this,aim, the locking elements 30 consist of a snap-together connection with locking elements 33 and 34 which grip behind each other.

As represented in FIGS. 5 to 7, the locking element 33 preferably consists of a local sharp protrusion of the lower side 35 of the tongue 31 which can be located in a recess 36 in a lower lip 43 extending distally from the lower wall 37 of the groove 32. The locking element 34 is formed by the upward directed part or protrusion which defines the distally outer end of recess 36.

In this case, the locking elements 33–34 have contact surfaces 38–39 which are parallel to each other and preferably extend in an inclined manner, according to a direction which simplifies the snapping-together of the panels. The common plane of tangency L which is determined by the common tangent at the meeting point or area of surfaces 38–39, hereby forms an angle A sloping inwardly and downwardly from an outer region to an inner region relative to the underside 7, which angle is smaller than 90°.

The locking elements 33–34 preferably are provided with inclined portions 40 and 41 which, when two floor panels 1 are engaged, cooperate with each other in such a manner that the locking elements 33–34 can easily be pushed over each other until they grip behind each other by means of a snap-together effect (FIGS. 6 and 7).

The thickness W1 of the tongue 31 preferably is equal to the width W2 of the groove 32, such that compression pressure P applied to the upper lip 42 is reacted by the tongue 31 which, in its turn, then is reacted by the lower lip 43.

Analogous to the chamfer 24 and recess 25, a recess 44 and a chamfer 45 are provided also at the edges 28–29.

It is noted that such a snap-together coupling can also be applied at the edges 2–3. Hereby, this can be a snap-together coupling analogous to these of FIGS. 5 to 7, but this can also be a snap-together coupling using other forms of coupling configurations, for example, such as represented in FIGS. 8 and 9. Contrary to the locking elements 33–34 which consist of rather local protrusions, in the forms of embodiment of FIGS. 8 and 9 use is made of locking elements 46–47 which, in comparison to the total width B of the coupling, extend over a rather large distance.

In this case, the locking elements 46–47 are also provided at the lower side 12 of the tongue 9 and the lower wall 14 of the groove 10.

According to FIG. 8, the locking elements 46–47 have contact surfaces 48–49 which are at an angle with the plane of the floor panel 1. In this manner, a coupling is obtained which is interlocked in a particularly fixed manner.

As represented in FIG. 9, the locking elements 46–47 possibly can be configured in such a manner that substantially only a linear contact is obtained, for example, because the contact surfaces directed towards each other are formed with different curvatures.

The surfaces, directed towards each other, of the locking elements 46–47 hereby consist of curved surfaces. The common plane of tangency L forms an angle A which is smaller than 90°, and more preferably is smaller than 70°.

In this manner, the locking element 46 preferably has two portions with a different curvature, on one hand, a portion 50 with a strong curvature and, on the other hand, a portion 51 with a weak curvature. The portion 50 with the strong curvature provides for the formation of a firm coupling. The portion 51 with the weak curvature facilitates the coupling parts 4–5 to be brought into each other easily. The intermediate space S forms a chamber which offers space for dust and the like which, when engaging two floor panes 1, inevitably infiltrates there.

In the case of a snap-together connection, for example, a connection such as represented in FIGS. 7 to 9, preferably the tongue 9–31 has a shape that thickens from below, which then can cooperate with a widened portion in the groove 10.

In FIG. 10, a variant is represented whereby at least at the level of the upper edges 15–16, a sealing material 52 is provided, as a result of which a watertight sealing can be assured. This sealing material 52 may consist of a strip or covering which is provided previously at the floor panel 1, either at one or both upperside edges 15–16.

In FIG. 11, a further variant is represented, whereby the locking element 6 is formed by an upward directed portion 53 at the tongue 9, which as a result of a turning movement of the panel, is brought behind a downward-directed portion 54 on the upper wall 18. More particularly, this is obtained by forming the upper side 17 and the upper wall 18 with a curvature R3, the center of which is situated at the upperside edges 15–16, and forming the lower side 12 and the lower wall 14 with a radius R4, the center of which is also situated at the upperside edges 15 and 16, respectively. These radii R3–R4 can be chosen otherwise, too.

In general, according to the invention, the difference between, on one hand, the radius R1, R3 respectively, and, on the other hand, the radius R2, R4 respectively, preferably should not be larger than 2 mm.

It is also preferred that the center of these radii be situated inside the circle C1, C2 (see FIG. 2) respectively, which extends with a radius R5 of 3 mm centered at upperside edge 15, 16 respectively.

Finally is noted that, according to the invention, the lower lip 23–43, as represented in FIGS. 2 to 7, can be formed distally longer than the upper lip 22–42. This has an advantage that the coupling parts 4–5–28–29 can be shaped in an easier manner by means of a milling cutter or the like. Furthermore, this simplifies the engagement of two floor panels 1, because each subsequent floor panel 1 during installation can be placed upon the protruding lower lip 23–43, as a result of which the tongue 9–31 and the groove 10–32 automatically are positioned in front of each other.

The embodiments wherein the lower lip 23 is equal to or distally shorter than the upper lip 22, in their turn, offer the advantage that no protruding lip 23 remains at the extreme edge of the floor which might cause problems in finishing the floor installation.

In order to allow for a smooth assembly, to guarantee the necessary stability and firmness and in order to limit the quantity of material to be cut away, the difference E between the distally outer edge of the upper lip 22–42 and the distally outer edge of the lower lip 23–43, measured in the plane of the floor panel and perpendicular to the longitudinal direction of the groove 10, should preferably be kept smaller than one time the total thickness F of the floor panel 1. For stability's sake, normally this total thickness F shall never be less than 5 mm.

The small dimension of the difference E offers the advantage that the lower lip need not be strengthened by a reinforcement strip or the like.

According to a particular form of embodiment, the central line M1 through the tongue 9 and the groove 10 is situated lower than the center line M2 of the floor panel 1, such, that the upper lip 22–42 is thicker than the lower lip 23–43. In first instance, this is essential in this kind of connection, because then it is the lower lip 23–43 which bends, whereby the upper side of the floor panel 1 is kept free of possible deformations.

As explained in the introduction, for the core 8 a material is chosen from the following series:
   a. a ground product which, by means of a binding agent or by means of melting together is made into a unitary composite material;
   a product based on synthetic material;
   chip board with fine chips.

The invention shows its usefulness, in first instance, preferably with laminated flooring, due to the reasons explained in the introduction.

As represented in the examples of the FIGS. 2 to 11, such laminated flooring preferably consists of a core 8 made of MDF medium density fiberboard board, HDF high density fiberboard board or similar, whereby at least at the upper side of this core 8 one or more layers of material are provided.

More particularly, it is preferred that the laminated flooring is provided with a decorative layer 55 and a protective top layer 56. The decorative layer 55 is a layer, impregnated with resin, for example, made of paper, which can be imprinted with a variety of patterns, such as a wood pattern, a pattern in the form of stone, cork, or similar or even with a fancy pattern. The protective top layer 56 preferably also consists of a layer saturated with resin, for example, melamine resin, which in the final product is transparent.

It is clear that still other layers can be applied, such as an intermediate layer 57 upon which the decorative layer 55 is provided.

Preferably, also a backing layer 58 shall be applied at the underside 7, forming a counterbalancing element for the top layers and, thus, guaranteeing the stability of the form of the floor panel 1. This backing layer 58 may consist of a material, for example paper, impregnated with a resin, for example, a melamine resin.

As represented schematically in FIG. 12, the tongue 9 and the groove 10, and preferably also the tongue 31 and the groove 32 are formed by means of a milling process. In the case that a profile has to be applied on all four sides, the floor panels 1 preferably shall be displaced by means of two sequential perpendicular movements V1 and V2, whereby during the first movement profiles at two opposite edges are provided, in this case the longitudinal edges, by means of milling devices 59–60, whereas during the second movement profiles are provided at the other edges, in this case the small edges, by means of milling devices 61–62. During these processing, the floor panels 1 preferably are put with their decorative layer directed downward.

According to an important characteristic of the invention, each respective tongue 9–31 and groove 10–32 are formed by means of a milling process with at least two sequential milling cycles or passes by means of milling cutters which are positioned at different angles in reference to the related floor panel 1.

Figure 13:
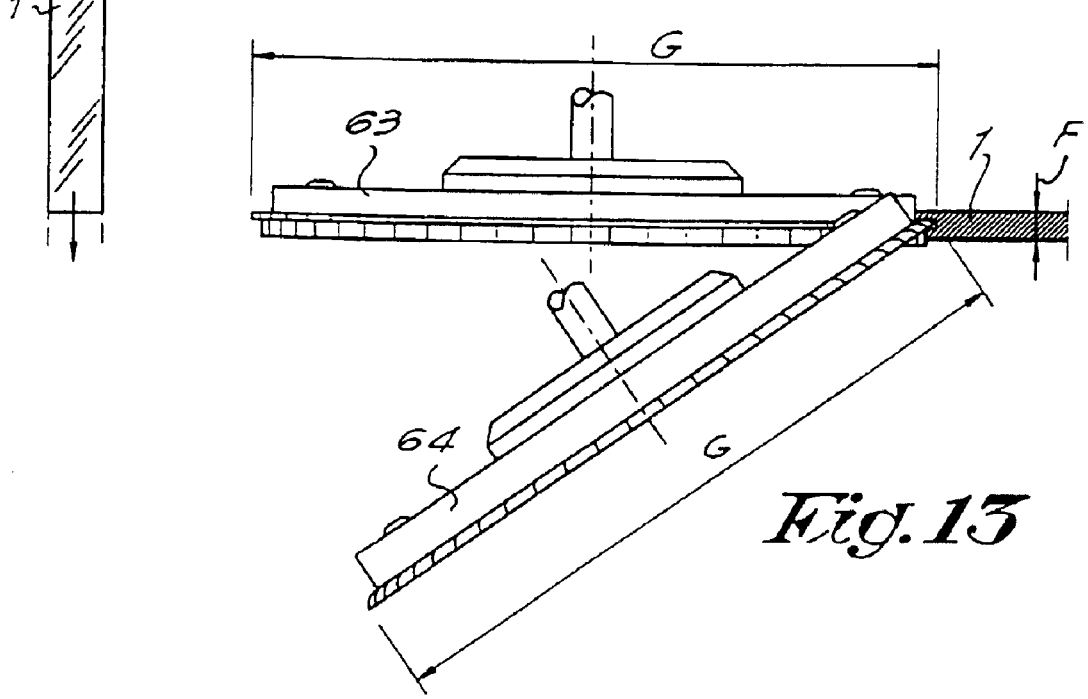
FIG. 13 represents a cross-section according to line XIII—XIII in FIG. 12.
Figure 14:
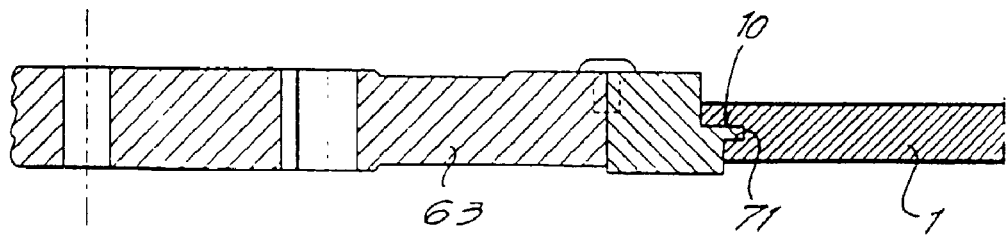
FIGS. 14 to 21, on a larger scale and in cross-section, represent the penetration of the milling cutters which are indicated in FIG. 12 with arrows F14 to F21.
Figure 15:
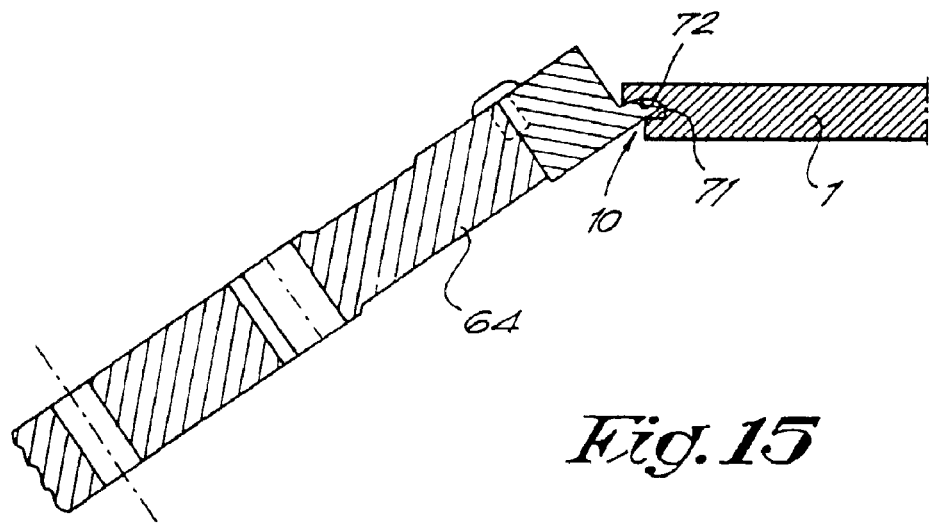
Figure 16:
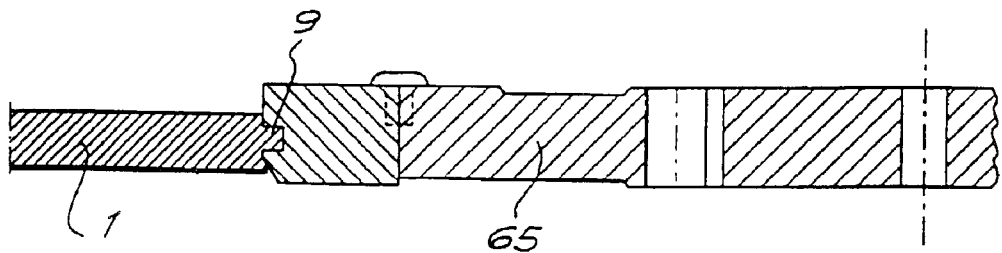
Figure 17:
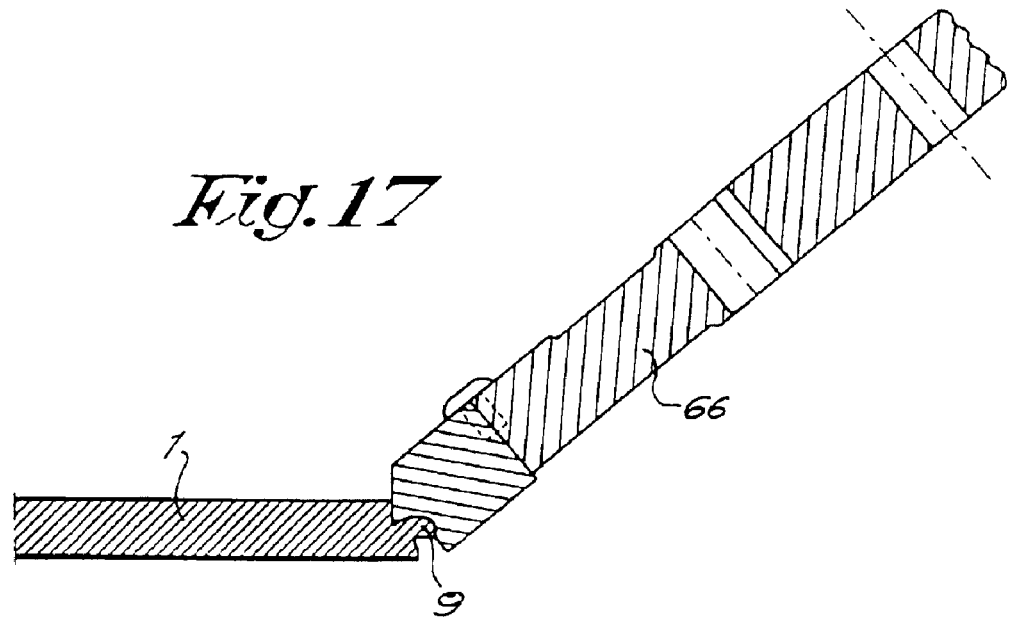
Figure 18:
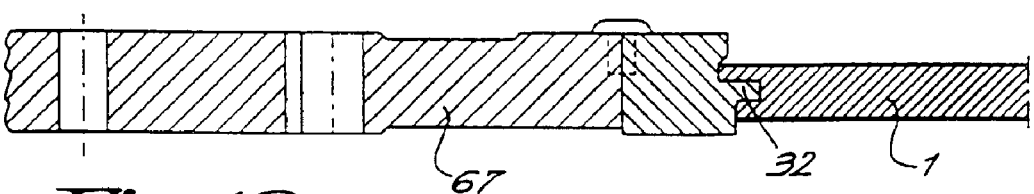
Figure 19:
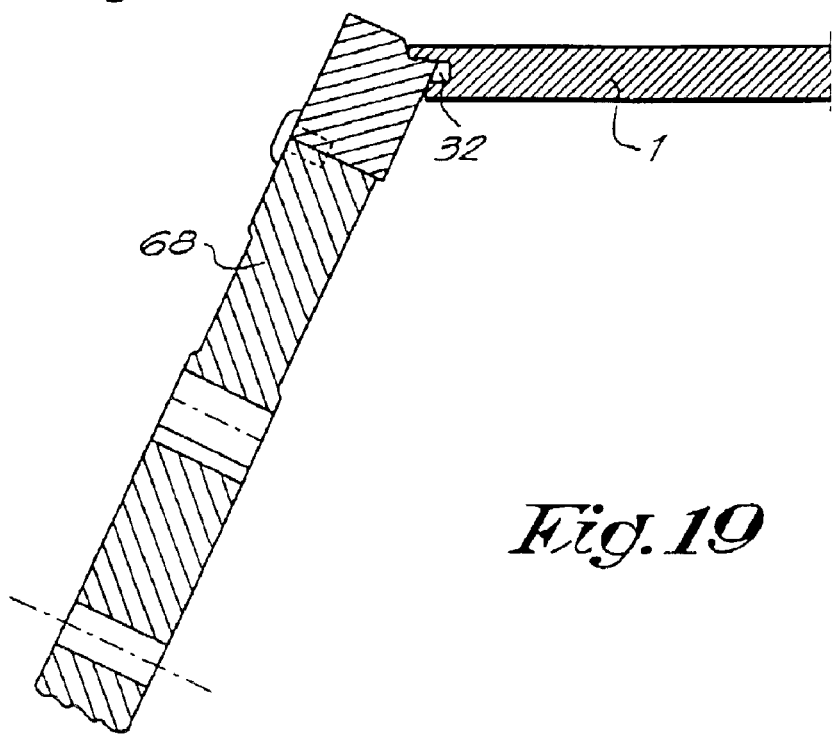
Figure 20:
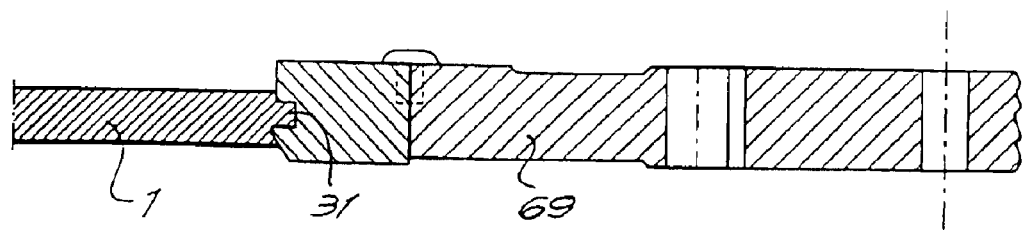
Figure 21:
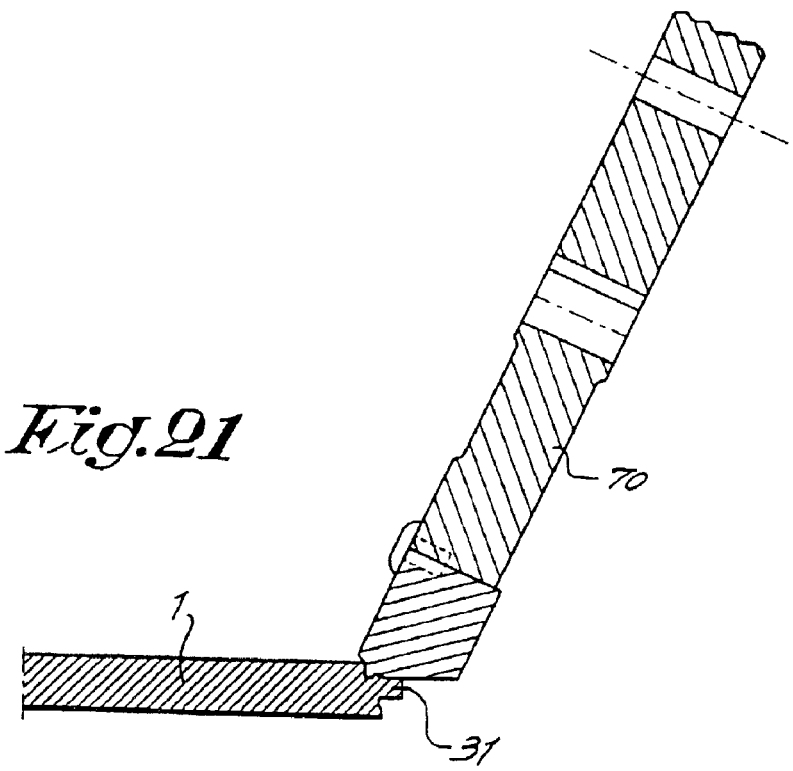

This is illustrated in FIGS. 13, 14 and 15, wherein it is represented how a groove 10 is realized by means of two milling cycles by means of two milling cutters 63 and 64. FIGS. 16 and 17 represent how the tongue 9 is shaped by means of milling cutters 65 and 66.

The FIGS. 18–19 and 20–21 represent similar views showing how the groove 32 and the tongue 31 are shaped by means of milling cutters 67–68 and 69–70, positioned at an angle.

During each of the aforementioned milling passes, substantially the final shape of one flank is fully realized. For example, the milling cutter 63 of FIG. 14 determines the final shape of the lower flank 71 of the groove 10, whereas the milling cutter 64 determines the final shape of the upper flank 72.

As mentioned in the introduction, preferably milling cutters 63 to 72 shall be used, having diameters G which are at least 5 times, and even better at least 20 times larger than the thickness F of the floor panels 1.

Apart of the mentioned milling cutters, preferably still other milling cutters are applied, for example, in order to remove a part of the material to be removed during a first premachining cycle.

In the FIGS. 22 to 25, a particularly preferred form of embodiment of a floor panel 1 according to the invention is represented. Hereby, the parts which correspond with the previous embodiments are indicated with corresponding references.

An important characteristic herein consists in that the coupling parts 4–5 are provided with locking elements 6 which, in engaged condition with the panels in a common plane, exert a tension force upon each other, as a result of which the engaged floor panels 1 are forced towards each other in compression. As represented, this is realized preferably by providing the coupling parts with an elastically yieldable or bendable portion, in this case the lower lip 43, which, in engaged condition, is at least partially bent and in this way creates a tension force which results in the engaged floor panels 1 being forced towards each other. The resultant bending V, as well as the tension force K, are indicated in the enlargement view of FIG. 23.

In order to obtain the tension force K pressing together the engaged floor panels 1, the bendable portion, in this case the lip 43, preferably is provided, as represented, with an inwardly and downwardly inclined contact surface 73 which preferably can cooperate with a corresponding contact surface 74 on tongue 9. These contact surfaces 73–74 are similar to the aforementioned contact surfaces 39–38 and also similar to the inclined portions of the lower lip of FIGS. 2 to 4.

In the FIGS. 2 and 5, the portions form complementary matching shapes; it is, however, clear that, by a modification, also a tension effect similar to that shown in FIG. 23 can be realized.

Due to, on one hand, the contact along the angle A, and, on the other hand, the fact that a tension force K is created, a compression force component K1 is produced, as a result of which the floor panels 1 are drawn against each other in compression.

Preferably, the angle A of the mutual plane of tangency of contact surfaces 73–74 relative to the horizontal plane is situated between 30 and 70 degrees. In the case that use is made of the embodiment whereby a tension force K is realized, an angle A of 30 to 70 degrees is ideal in order, on one hand, to effect an optimum pressing-together of the floor panels 1 and, on the other hand, to ensure that the floor panels 1 can easily be engaged and respectively disassembled.

Although the pressing or compression force component K1 preferably is delivered by the aforementioned lip 43, the invention does not exclude other forms of locking elements or structures whereby this force is delivered by other bendable portions.

It is noted that the bending V is relatively small, for example, several hundredths up to several tenths of a millimeter, and does not have an influence upon the placement of the floor covering. Furthermore it should be noted that such floor covering generally is placed upon an underlayer (not shown) which is elastically compressible, as a result of which the bending V of the lip 43 only produces local bending of the underlayer.

Due to the fact that the lip 43 is bent apart and that it remains somewhat bent apart in engaged position, the additional advantage is obtained that, when exerting a pressure upon the floor covering, for example, when placing an object thereupon, the pressing-together compressive force is enhanced and, thus, the development of gaps is counteracted even more.

It is noted that the inventors have found that, contrary to all expectations, an ideal tension force can be realized by manufacturing the coupling parts 4–5, including the locking elements 33–34, and preferably the complete core 8, of HDF board or MDF board, although these material normally only allow a minor elastic deformation.

HDF and MDF also offer the advantage that smooth surfaces are obtained, as a result of which the locking elements can be moved easily over each other.

According to a variant of the invention, the tension force can also be supplied by means of an elastic compression of the material of the coupling parts themselves, to which end these coupling parts, and preferably the complete core 8, would be manufactured using an elastically compressible material.

Figure 24:
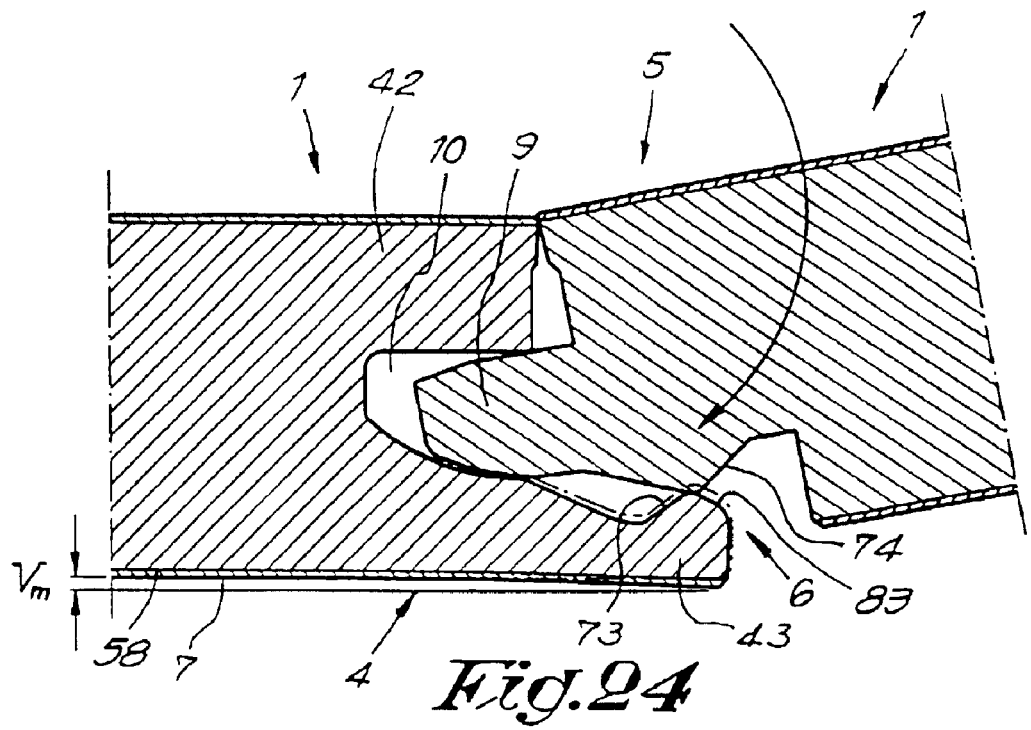
FIGS. 24 and 25 represent two manners of coupling floor panels according to FIG. 22 to each other.
Figure 25:
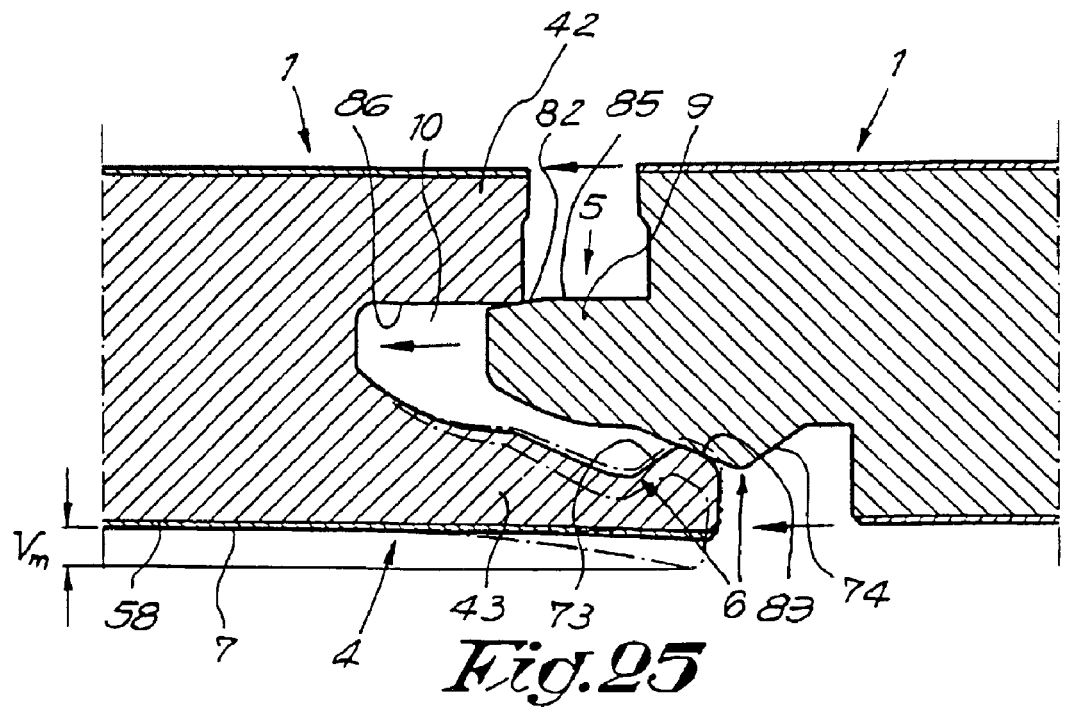

A further particular characteristic of the embodiment of FIGS. 22 to 25 consists in that the floor panels 1 can be selectively engaged by means of a turning movement, as represented in FIG. 24, as well as by means of laterally shifting them towards each other in substantially a common plane, as represented in FIG. 25, preferably in such a manner that, during the engagement by means of the turning movement with the coupling parts partially engaged, a maximum bending Vm results in the coupling parts, more particularly in the lip 43, which bending Vm is less pronounced, if not nonexistent, as in the FIGS. 2 to 4, in comparison to the bending Vm which results when the floor panels 1 are engaged by means of shifting them towards each other, as in FIG. 15.

The advantage of this consists in that the floor panels 1 can be engaged easily by means of a turning movement, without necessitating use of a tool therefore, whereas it still remains possible to engage the floor panels also by means of shifting them laterally. This latter is useful, in first instance, when the last panel has to be placed partially under a door frame or similar situation. In this case, the floor panel 1 can be pushed under the door frame with the side which does not have to be engaged and subsequently, possibly by means of tools, can be snapped into the adjacent floor panel by lateral sliding together.

It is noted that the shapes of the coupling parts 4–5 shown in FIGS. 22 to 25 can also be used for the coupling parts 28–29 of the short sides of the panels.

According to the invention, in the case that the four sides 2–3–26–27 are provided with coupling pars 4–5–28–29, these coupling parts can be formed in such a manner that in one direction a firmer engagement than in the other direction is effected. In the case of elongated floor panels 1, for example, such as represented in FIG. 1, the locking at the small sides 26–27 preferably shall be more pronounced than at the longitudinal sides 2–3. The length of the parts at the small sides, namely, is smaller and, in principle, less firm. This is compensated for by providing a more pronounced locking.

This difference in engagement can be obtained by shaping the contact surfaces 73–74 with different angles.

Preferably, the aforementioned protrusion, more particularly the locking element 33, is bounded by at least two portions 75–76 (shown in FIG. 22), respectively a portion 75 with a strong (steep) inclination which provides for the locking, and a portion 76 with a weaker (less inclined) inclination which renders the engagement or guidance of the coupling parts easier. In the embodiment of FIGS. 22 to 25, these portions 75–76 are formed by straight planes, but, as already described with reference to FIG. 9, use can also be made of curved portions 50–51. In FIG. 5, these are the contact surface 38 and the inclined portion 40.

In the preferred form of the invention, the floor panels 1 comprise coupling parts 4–5 and/or 28–29 exhibiting one of the following or the combination of two or more of the following features:

- a curvature 77 (shown in FIG. 22) at the lower side of the tongue 9 and/or a curvature 78 at the lower lip 43 which form a guidance when turning two floor panels 1 into each other, with the advantage that the floor panels 1 can be engaged into each other easily during installation;

- roundings 79–80 at the edges of the locking elements 33–34, with the advantages that the locking elements can easily shift over each other during their engagement, or during disassembly of the floor panels 1 and that the locking elements will not be damaged, for example, crumble away at their edges, even if the floor panels are engaged and disassembled;

- dust chambers 81, or spaces 21 as in FIG. 4, between all sides, directed laterally towards each other, of the engaged floor panels 1, with the advantage that inclusions which get between the floor panels 1 during the engagement do not exert an adverse influence upon good engagement;

- a shaping of the tongue 9 which is such, for example, by the presence of a chamfer 82, that the upper side of the tongue 9 becomes situated from the first joining together or substantial contact of the panels, under the lower side of the upper lip 42 when the floor panels 1 are pushed towards each other in substantially the same plane, as indicated in FIG. 25, with the advantage that the front extremity or end of the tongue 9 does not press against the front side of the upper lip 42 or the front edge of the bottom lip 43 when the floor panels are pushed towards each other in the same plane;

- a ramp surface 83, hereinbefore also called inclined portion 41, formed at the distally outer end of the lower lip 43, with the advantage that the locking elements 33–34 shift smoothly over each other and that the lower lip 43 is bent uniformly;

- in the engagement direction only one important contact point which is formed by a section 84 at the location of the upperside edges of the floor panels 1, with the advantage that the aforementioned tension force is optimally transferred to the upper side of the floor panels 1 and that the development of openings between the floor panels 1 is counteracted;

- contact surfaces 85–86, more particularly abutment surfaces, formed by the upper side of the tongue 9 and the upper side of the groove 10 which, over the largest portion of their length, are flat and run parallel to the plane which is defined by the floor panels 1, as well as contact surfaces cooperating with each other, formed by curvatures 77–78, with the advantage that no mutual displacement in height between two engaged floor panels 1 is possible, even if the insertion depth of the tongue 9 into the groove 10 should vary due to various causes; in other words, no height differences may occur between the adjacent floor panels.

In the embodiment of FIGS. 22 to 25, all these characteristics are combined; it is, however, clear that, as becomes evident from FIGS. 2 to 11, these features can also be provided separately or in a limited combination with one another.

As becomes evident from FIGS. 5 to 7 and 22 to 25, an important characteristic of the preferred embodiment of the invention consists in that the cooperative locking element 6, in other words, the portion providing for the snap-together and engagement effect, are situated in that portion of the lower lip 23–43 which extends beyond the distal edge of the upper lip 22–42, more particularly, the lowermost point 87 of the locking part 33 is situated under the top layer of the floor panel 1. For clarity's sake, this top layer is indicated in the FIGS. 22–25 only as a single layer.

It should be noted that the combination of features, the lower lip 23–43 extending further than the upper lip 22–42; the locking elements 6 being formed at least by means of a contact surface portion which inwardly slopes downward, and wherein this portion, at least partially, is located in the portion of the lower lip 23–43 which extends distally beyond the upper lip 22–42, is particularly advantageous, among others, in comparison with the couplings for floor panels described in the documents WO 94/01628, WO 94/26999, WO 96/27719 and WO 96/27721. The sloping contact surface portion offers the advantage that the floor panels 1 can be disassembled again. The fact that this sloping portion is situated in the extended portion of the lower lip 23–43 adds the advantage that no deformations can occur during coupling which manifest themselves up to the top layer.

According to a preferred characteristic of the invention, the aforementioned portion, i.e. the contact surface 39 or 73, preferably extends in such a manner that the distance between the upper edge 16 of the panel to the contact surface 39, 73 diminishes between the proximal and distal ends of the sloping contact surface 39, 73, in other words, such that, as represented in FIG. 22, the distance X2 is smaller than the distance X1. This is also the case in FIG. 7.

Still preferably, this portion only starts at a clear distance El from the outer edge of upper lip 42.

It is obvious that the coupling parts 22 to 25 can also be shaped by means of said milling process.

According to a particular characteristic of the invention, the floor panels 1 are treated at their sides 2–3 and/or 26–27 with a surface densifying agent, more particularly a surface hardening agent, which preferably is chosen from the following series of products: impregnation agents, pore-sealing agents, lacquers, resins, oils, paraffins and the like.

In FIG. 22, such impregnation 88 is represented schematically. This treatment can be performed over the complete surface of the sides 2–3 and/or 26–27 or only over specific portions hereof, for example exclusively on the surfaces of the tongue 9 and the groove 10.

The treatment with a surface densifying agent offers, in combination with the snap-together effect, the advantage that in various aspects better coupling characteristics are obtained. As a result of this, the coupling parts 4–5 and/or 28–29 better keep their shape and strength, even if the floor panels 1 are engaged and disassembled repeatedly. In particular, if the core 8 is made of HDF, MDF or similar materials, by means of this treatment a better quality of surface condition is obtained, such that no abrasion of material occurs during engaging, or during disassembling.

This treatment also offers the advantage that, at least in the case of a surface hardening, the aforementioned elastic tensioning effect is enhanced.

The present invention is in no way limited to the forms of embodiment described by way of example and represented in the figures, however, such floor covering and the pertaining floor panels 1 can be embodied in various forms and dimensions without departing from the scope of the invention.

For example, the various characteristics which are described by means of the represented embodiments or examples may be selectively combined with each other.

Furthermore, all embodiments of coupling elements described before can be applied at the longer side as well as at the shorter side of a panel.

What is claimed is:

1. A floor covering panel comprising:
    a laminated hard floor panel having a wood-based core material selected from the group consisting of High Density Fibreboard (HDF) and Medium Density Fibreboard (MDF), said panel comprising a first pair and a second pair of opposed side edges, and upper and under sides;
    said panel further comprising coupling parts being integrally made in one piece with said core material and located at both of the pairs of side edges, said coupling parts comprising a tongue, a groove and integrated locking elements, said tongue, groove and locking elements when coupled along adjacent side edges of two ones of said panel cooperating to establish a mechanical lock preventing relative movement between the coupled parts in a direction perpendicular to the plane of the panel as well as in a direction perpendicular to the side edges and parallel to a plane including the panels;
    said coupling parts of at least one pair of opposite side edges having a form enabling coupling of the coupling parts by shifting them laterally towards each other with the panels located substantially in the same plane to couple the coupling parts of said one pair of side edges; and
    wherein the coupling parts of said one pair of side edges define a snap-together coupling providing a snap-action during coupling of two panels obtained by shifting them laterally towards each other, said snap-action involving an elastic deformation of the groove and being delivered substantially entirely by said core material; and
    wherein said groove of said coupling parts includes a lower lip, and wherein said snap-action involves an elastic deformation of said lower lip.

2. The floor covering panel according to claim 1, wherein said coupling parts upon coupling are secured so that they are coupled without play in the plane of coupled panels.

3. The floor covering panel according to claim 1, at least one edge of said one pair of edges comprising said lower lip, said lower lip defining at least in part a lower wall of the groove of said coupling parts and extending distally beyond a respective opening defined by the groove, said lower lip including a recess in an upper side of the lip;
    wherein the opposed edge of said one pair of edges comprises a protrusion extending from an under side of the tongue of said coupling parts;
    said locking elements and said snap-together coupling comprising said protrusion and recess.

4. The floor covering panel according to claim 3, wherein said recess and protrusion include arcuate portions.

5. The floor covering panel according to claim 1, including a surface densifying agent on the coupling parts and locking elements of the floor panel, including the locking elements.

6. The floor covering panel according to claim 5, wherein said side edges including the coupling parts and locking elements include said surface densifying agent thereon.

7. The floor covering panel according to claim 1, wherein said coupling parts comprise a recess located in said lower lip, said lower lip extending at least to a side edge of a respective panel; and
    a protrusion provided on an under side of a tongue part of the coupling parts.

8. The floor covering panel according to said lip having a progressively increasing thickness from said recess and towards an area of the lip located proximally inwardly of the recess.

9. The floor covering panel according to claim 8, said lip area of a progressively increasing thickness extending along an area of the lower lip.

10. The floor covering panel according to claim 1, wherein;

a lower wall of the groove defines in part said lower lip;

the tongue is formed to become lodged in the groove upon lateral motion of the panels towards each other in substantially a common plane to couple the panels with the tongue becoming at least partially inserted into the groove before any deformation of the coupling parts during coupling and before any snap-action between the coupling parts.

11. The floor covering panel according to claim 10, wherein the lodging of said tongue in said groove occurs when the lateral motion of the panels is started from positions at which the panels are completely separated from each other.

12. The floor covering panel according to claim 10, wherein said tongue includes an under side adapted to slide over a distal upper portion of the lower lip when the panels are moved towards each other to establish coupling between coupling parts of the panels;

and said lower lip including a distal upper end portion that is upwardly inclined from the distal end towards a proximal direction of the lip to thereby facilitate sliding of the under side of the tongue over the distal upper end portion of the lower lip upon lateral shifting motion of the tongue and groove towards each other to couple the coupled parts.

13. The floor covering panel according to claim 10, including a planar tongue surface on an upper side of said tongue and a planar upper wall surface on an upper wall of said groove, said planar tongue and groove upper wall surfaces cooperating in contacting relationship when the coupled parts are coupled to each other to prevent drifting apart of coupled floor panels in a direction perpendicular to the plane of each panel.

14. The floor covering panel according to claim 10, wherein a distal upper end portion of the tongue includes an inclined contact surface inclined downwardly in the distal direction of the tongue, said inclined contact surface located so as to engage a distal end of an upper wall of the groove upon initial engagement between the tongue and groove when the coupling parts are coupled together.

15. A floor covering panel comprising:

a laminated hard floor panel having a wood-based core material including a material selected from the group consisting of High Density Fibreboard (HDF) and Medium Density Fibreboard (MDF), said panel comprising a first pair and a second pair of opposed side edges, and upper and under sides;

said panel further comprising coupling parts being integrally made in one piece with said core material and located along at least one of said pairs of side edges, said coupling parts comprising a tongue, a groove, and integrated locking elements, said tongue, groove and locking elements when coupled along adjacent side edges of two ones of said panel establishing a mechanical lock between the coupled parts of coupled panels and locking the coupled panels against relative movement in a direction perpendicular to the plane of the panel as well as in a direction perpendicular to the side edges and parallel to a plane including the panels when the coupling parts are coupled;

wherein said coupling parts of said at least one pair of opposite side edges are formed to enable coupling of two ones of said floor panel by shifting them laterally towards each other to couple the coupling parts of said at least one pair of side edges with the panels located substantially in the same plane;

wherein the coupling parts of said at least one pair of side edges define a snap-together coupling providing a snap-action during coupling of two panels obtained by shifting them laterally towards each other, said snap-action involving an elastic deformation of the groove.

16. The floor covering panel according to claim 15, wherein said locking elements comprise a recess located on the upper side of a lip defined at least in part by a lower wall of said groove and a protrusion extending downward from the under side of said tongue;

a planar tongue surface on an upper side of said tongue and a planar upper wall surface on an upper wall of said groove, said planar tongue and groove upper wall surfaces cooperating in contacting relationship upon coupling of said coupled parts to prevent relative motion of coupled floor panels in a direction perpendicular to the plane of each panel.

17. The floor covering panel according to claim 16, wherein said lip progressively increases in thickness along at least a portion of said area of the lip defining at least in part a lower wall of said groove.

18. The floor covering panel according to claim 16, wherein said under side of said tongue includes an arcuate portion between said protrusion and a distal end portion of said tongue.

19. The floor covering panel according to claim 15, wherein said coupling parts upon coupling are secured so that they are coupled without play in the plane of coupled panels.

20. A floor covering panel comprising:

a laminated hard floor panel having a wood-based core comprising HDF/MDF material, said panel further comprising a first pair and a second pair of opposed side edges, and upper and under sides;

said panel further comprising coupling parts integrally made in one piece with said core material and located at both of the pairs of side edges, said coupling parts comprising a tongue, a groove, and integrated locking elements, said tongue, groove and locking elements when coupled along adjacent side edges of two ones of said panel cooperating to establish a mechanical lock preventing relative movement between the coupled parts of coupled panels in a direction perpendicular to the plane of the panel as well as in a direction perpendicular to the side edges and parallel to a plane including the panels;

said coupling parts of at least one pair of opposite side edges having a form enabling coupling of two ones of said floor panel by shifting them laterally towards each other with the panels located substantially in the same plane; and wherein the coupling parts of said one pair of side edges define a snap-together coupling providing a snap-action during coupling of two panels obtained by shifting them laterally towards each other, said snap-action involving an elastic deformation of the groove;

at least one edge of said one pair of edges comprising a lower lip defining at least in part a lower side wall of the groove of said coupling parts and extending distally beyond an upper lip of the groove, said lower lip including a recess in an upper side of the lower lip;

wherein an opposed edge of said one pair of edges comprises a tongue comprising said coupling parts, said tongue including a protrusion extending from an under side of the tongue;

said protrusion and recess comprising said snap-together coupling, and snap-fitting together upon laterally shifting and coupling the coupling parts;

said lower lip having an area of progressively increasing thickness along an area of said lower lip extending proximally relative to said recess.

21. The floor covering panel according to claim 20, wherein said lower lip area of progressively increasingly thickness extends along at least a portion of said lower lip defining said lower wall of said groove.

22. A flooring panel according to claim 20, wherein said snap-action involves an elastic deformation of said lower lip.

23. A floor covering panel formed of HDF/MDF core material:

said panel having upper and under sides, and comprising at least two opposed side edges monolithically formed of said core material, said at least two side edges having coupling parts monolithically formed in the core material of each of said side edges;

one of said side edges including a tongue comprising one of said coupling parts and the other of said side edges having a groove with at least one lip comprising another of said coupling parts, said lip being elastically deflectable relative to said panel such that when the coupling parts of adjacent side edges of two of said panels are coupled, the coupled coupling parts define integral snap-fit mechanical locking elements;

said locking elements preventing drifting apart of coupled floor panels in a direction perpendicular to the plane of the coupled panels and in a direction parallel to a plane including the coupled panels and perpendicular to the coupled edges.

24. The floor covering panel according to claim 23, wherein the snap-fit mechanical locking elements include a locking protrusion defined on the tongue and a cooperating recess defined in the groove.

25. The floor covering panel according to claim 24, wherein the locking protrusion is defined on a lower side of said tongue.

26. The floor covering panel according to claim 24, wherein said at least one lip is a lower lip, and the groove includes an upper lip, said lower lip extending distally beyond the upper lip.

27. The floor covering panel according to claim 26, wherein the cooperating recess formed in the lower lip further defines a portion of a clearance that is established when the coupling parts are coupled.

28. The floor covering panel according to claim 25, wherein the locking protrusion extends substantially downward from the under side of the tongue and the recess defined in the groove is oriented in juxtaposed alignment with the locking protrusion when the coupling parts are coupled.

29. The floor covering panel according to claim 23, wherein said coupling parts upon coupling are secured so that they are coupled without play in the plane of coupled panels.

30. The floor covering panel according to claim 23, wherein at least one clearance is formed at a portion of an area between the tongue and groove of adjacent coupled coupling parts, and wherein said coupling parts upon coupling are secured so that they are coupled without play in the plane of coupled panels.

31. The floor covering panel according to claim 23, wherein said at least one lip is a lower lip, and the lower lip has a cross-section configuration uniform along the panel edge and has a non-uniform thickness between upper and under sides thereof.

32. The floor covering panel according to claim 24, wherein the respective tongue and groove of coupled coupling parts snap-fit together when coupled by shifting them laterally towards each other in a substantially common plane.

33. The floor covering panel according to claim 24, wherein the respective tongue and groove of coupled coupling parts exhibit snap-action when coupled or uncoupled by rotational motion relative to one another about an axis extending parallel to said adjacent side edges.

34. The floor covering panel according to claim 33, wherein the groove of coupled coupling parts defines at least one portion of a clearance adjacent at least one area of contact between said tongue and groove.

35. The floor covering panel according to claim 24, wherein the at least one lip is a lower lip and the groove includes an upper lip, each lip extending distally substantially the same length.

36. The floor covering panel according to claim 23, further comprising other coupling parts monolithically formed in the core material of the other pair of opposed side edges of the panel, said other coupling parts including a tongue and groove.

37. The floor covering panel according to claim 36, wherein the tongue and groove of the other coupling parts include monolithically formed mechanical locking elements.

38. The floor covering panel according to claim 37, wherein the groove includes upper and lower lips, said lower lip extending distally beyond said upper lip.

39. The floor covering panel according to claim 38, wherein the groove includes upper and lower lips, and the locking elements include a locking protrusion provided in an under side of the tongue and a cooperating recess defined in the lower lip.

40. The floor covering panel according to claim 36, wherein at least one clearance is formed at a portion of an area between the tongue and groove of adjacent coupled coupling parts.

41. The floor covering panel according to claim 37, wherein the groove includes upper and lower lips, wherein the lower lip has a cross-section configuration uniform along the respective panel edge and has a non-uniform thickness between upper and under sides thereof.

42. The floor covering panel according to claim 37, wherein the at least one lip is a lower lip, and at least a distal end portion of the lower lip is elastically bendable relative to a proximal end portion of the lower lip.

43. The floor covering panel according to claim 42, wherein the respective tongue and groove of coupled coupling parts snap-fit together when coupled by shifting them laterally towards each other in a substantially common plane.

44. The floor covering panel according to claim 36, wherein the respective tongue and groove of coupled coupling parts of said opposed pairs of side edges exhibit snap-action when coupled or uncoupled by rotational motion relative to one another about an axis extending parallel to said adjacent side edges.

45. A floor covering panel comprising:

a laminated hard floor panel having a wood-based core material including a material selected from the group consisting of High Density Fibreboard (HDF) and Medium Density Fibreboard (MDF), said panel comprising a first pair and a second pair of opposed side edges, and upper and under sides;

said panel further comprising coupling parts being integrally made in one piece with said core material and located along at least one of said pairs of side edges, said coupling parts comprising a tongue, a groove, and integrated locking elements, said tongue, groove and locking elements when coupled along adjacent side edges of two ones of said panel establishing a mechanical lock between the coupled parts of coupled panels and locking the coupled panels against relative movement in a direction perpendicular to the plane of the panel as well as in a direction perpendicular to the side edges and parallel to a plane including the panels when the coupling parts are coupled;

wherein said coupling parts of said at least one pair of opposite side edges are formed to enable coupling of two ones of said floor panel by shifting them laterally towards each other to couple the coupling parts of said at least one pair of side edges with the panels located substantially in the same plane;

wherein the coupling parts of said at least one pair of side edges define a snap-together coupling providing a snap-action during coupling of two panels obtained by shifting them laterally towards each other, said snap-action involving an elastic deformation of the groove;

wherein said locking elements comprise a recess located on the upper side of a lip defined at least in part by a lower wall of said groove and a protrusion extending downward from the under side of said tongue;

a planar tongue surface on an upper side of said tongue and a planar upper wall surface on an upper wall of said groove, said planar tongue and groove upper wall surfaces cooperating in contacting relationship upon coupling of said coupled parts to prevent relative motion of coupled floor panels in a direction perpendicular to the plane of each panel;

wherein said under side of said tongue includes an arcuate portion between said protrusion and a distal end portion of said tongue; and wherein said protrusion is a local sharp protrusion.

46. A floor covering panel comprising:

a laminated hard floor panel having a wood-based core material including a material selected from the group consisting of High Density Fibreboard (HDF) and Medium Density Fibreboard (MDF), said panel comprising a first pair and a second pair of opposed side edges, and upper and under sides;

said panel further comprising coupling parts being integrally made in one piece with said core material and located along at least one of said pairs of side edges, said coupling parts comprising a tongue, a groove, and integrated locking elements, said tongue, groove and locking elements when coupled along adjacent side edges of two ones of said panel establishing a mechanical lock between the coupled parts of coupled panels and locking the coupled panels against relative movement in a direction perpendicular to the plane of the panel as well as in a direction perpendicular to the side edges and parallel to a plane including the panels when the coupling parts are coupled;

wherein said coupling parts of said at least one pair of opposite side edges are formed to enable coupling of two ones of said floor panel by shifting them laterally towards each other to couple the coupling parts of said at least one pair of side edges with the panels located substantially in the same plane;

wherein the coupling parts of said at least one pair of side edges define a snap-together coupling providing a snap-action during coupling of two panels obtained by shifting them laterally towards each other, said snap-action involving an elastic deformation of the groove;

wherein said locking elements comprise a recess located on the upper side of a lip defined at least in part by a lower wall of said groove and a protrusion extending downward from the under side of said tongue;

a planar tongue surface on an upper side of said tongue and a planar upper wall surface on an upper wall of said groove, said planar tongue and groove upper wall surfaces cooperating in contacting relationship upon coupling of said coupled parts to prevent relative motion of coupled floor panels in a direction perpendicular to the plane of each panel; and wherein said under side of said tongue includes an arcuate portion, said arcuate portion defining said protrusion.

47. A floor covering panel comprising:

a laminated hard floor panel having a wood-based core material including a material selected from the group consisting of High Density Fibreboard (HDF) and Medium Density Fibreboard (MDF), said panel comprising a first pair and a second pair of opposed side edges, and upper and under sides;

said panel further comprising coupling parts being integrally made in one piece with said core material and located along at least one of said pairs of side edges, said coupling parts comprising a tongue, a groove, and integrated locking elements, said tongue, groove and locking elements when coupled along adjacent side edges of two ones of said panel establishing a mechanical lock between the coupled parts of coupled panels and locking the coupled panels against relative movement in a direction perpendicular to the plane of the panel as well as in a direction perpendicular to the side edges and parallel to a plane including the panels when the coupling parts are coupled;

wherein said coupling parts of said at least one pair of opposite side edges are formed to enable coupling of two ones of said floor panel by shifting them laterally towards each other to couple the coupling parts of said at least one pair of side edges with the panels located substantially in the same plane;

wherein the coupling parts of said at least one pair of side edges define a snap-together coupling providing a snap-action during coupling of two panels obtained by shifting them laterally towards each other, said snap-action involving an elastic deformation of the groove;

wherein said locking elements comprise a recess located on the upper side of a lip defined at least in part by a lower wall of said groove and a protrusion extending downward from the under side of said tongue;

a planar tongue surface on an upper side of said tongue and a planar upper wall surface on an upper wall of said groove, said planar tongue and groove upper wall surfaces cooperating in contacting relationship upon coupling of said coupled parts to prevent relative motion of coupled floor panels in a direction perpendicular to the plane of each panel; and wherein said protrusion is a local sharp protrusion and wherein said lip defines in part a lower wall of said groove, said lip and lower wall progressively increasing in thickness between said recess and an area of said lip located within said groove at proximally inner area of said lip.

48. A floor covering panel comprising:

a laminated hard floor panel having a wood-based core comprising HDF/MDF material, said panel further comprising a first pair and a second pair of opposed side edges, and upper and under sides;

said panel further comprising coupling parts integrally made in one piece with said core material and located at both of the pairs of side edges, said coupling parts comprising a tongue, a groove, and integrated locking elements, said tongue, groove and locking elements when coupled along adjacent side edges of two ones of said panel cooperating to establish a mechanical lock preventing relative movement between the coupled parts of coupled panels in a direction perpendicular to the plane of the panel as well as in a direction perpendicular to the side edges and parallel to a plane including the panels;

said coupling parts of at least one pair of opposite side edges having a form enabling coupling of two ones of said floor panel by shifting them laterally towards each other with the panels located substantially in the same plane; and wherein the coupling parts of said one pair of side edges define a snap-together coupling providing a snap-action during coupling of two panels obtained by shifting them laterally towards each other, said snap-action involving an elastic deformation of the groove;

at least one edge of said one pair of edges comprising a lower lip defining at least in part a lower side wall of the groove of said coupling parts and extending distally beyond an upper lip of the groove, said lower lip including a recess in an upper side of the lower lip;

wherein an opposed edge of said one pair of edges comprises a tongue comprising said coupling parts, said tongue including a protrusion extending from an under side of the tongue;

said protrusion and recess comprising said snap-together coupling, and snap-fitting together upon laterally shifting and coupling the coupling parts;

said lower lip having an area of progressively increasing thickness along an area of said lower lip extending proximally relative to said recess;

wherein said lower lip area of progressively increasingly thickness extends along at least a portion of said lower lip defining said lower wall of said groove;

wherein said snap-action involves an elastic deformation of said lower lip; and wherein upon coupling of said coupling parts said lower lip remains slightly bent relative to a relaxed, non-deformed position of the lower lip.

49. A floor covering panel formed of HDF/MDF core material:

said panel having upper and under sides, and comprising at least two opposed side edges monolithically formed of said core material, said at least two side edges having coupling parts monolithically formed in the core material of each of said side edges;

one of said side edges including a tongue comprising one of said coupling parts and the other of said side edges having a groove with at least one lip comprising another of said coupling parts, said lip being elastically deflectable relative to said panel such that when the coupling parts of adjacent side edges of two of said panels are coupled, the coupled coupling parts define integral snap-fit mechanical locking elements;

said locking elements preventing drifting apart of coupled floor panels in a direction perpendicular to the plane of the coupled panels and in a direction parallel to a plane including the coupled panels and perpendicular to the coupled edges;

wherein the snap-fit mechanical locking elements include a locking protrusion defined on the tongue and a cooperating recess defined in the groove; and wherein the locking protrusion is in the form of a local sharp protrusion on the under side of said tongue.

50. A floor covering panel formed of HDF/MDF core material:

said panel having upper and under sides, and comprising at least two opposed side edges monolithically formed of said core material, said at least two side edges having coupling parts monolithically formed in the core material of each of said side edges;

one of said side edges including a tongue comprising one of said coupling parts and the other of said side edges having a groove with at least one lip comprising another of said coupling parts, said lip being elastically deflectable relative to said panel such that when the coupling parts of adjacent side edges of two of said panels are coupled, the coupled coupling parts define integral snap-fit mechanical locking elements;

said locking elements preventing drifting apart of coupled floor panels in a direction perpendicular to the plane of the coupled panels and in a direction parallel to a plane including the coupled panels and perpendicular to the coupled edges;

wherein the snap-fit mechanical locking elements include a locking protrusion defined on the tongue and a cooperating recess defined in the groove; and wherein the locking protrusion on said tongue has a profile including an apex.

51. The floor covering panel according to claim 50, wherein the locking protrusion includes a first and second sloping surface extending from said apex.

52. The floor covering panel according to claim 51, wherein the slope of the first sloping surface relative to the tongue is greater than the slope of the second sloping surface relative to the tongue.

53. A floor covering panel formed of HDF/MDF core material:

said panel having upper and under sides, and comprising at least two opposed side edges monolithically formed of said core material, said at least two side edges having coupling parts monolithically formed in the core material of each of said side edges;

one of said side edges including a tongue comprising one of said coupling parts and the other of said side edges having a groove with at least one lip comprising another of said coupling parts, said lip being elastically deflectable relative to said panel such that when the coupling parts of adjacent side edges of two of said panels are coupled, the coupled coupling parts define integral snap-fit mechanical locking elements;

said locking elements preventing drifting apart of coupled floor panels in a direction perpendicular to the plane of the coupled panels and in a direction parallel to a plane including the coupled panels and perpendicular to the coupled edges;

wherein the snap-fit mechanical locking elements include a locking protrusion defined on the tongue and a cooperating recess defined in the groove; and the locking protrusion is substantially triangular in shape.

54. A floor covering panel formed of HDF/MDF core material:

said panel having upper and under sides, and comprising at least two opposed side edges monolithically formed of said core material, said at least two side edges having coupling parts monolithically formed in the core material of each of said side edges;

one of said side edges including a tongue comprising one of said coupling parts and the other of said side edges having a groove with at least one lip comprising another of said coupling parts, said lip being elastically deflectable relative to said panel such that when the coupling parts of adjacent side edges of two of said panels are coupled, the coupled coupling parts define integral snap-fit mechanical locking elements;

said locking elements preventing drifting apart of coupled floor panels in a direction perpendicular to the plane of the coupled panels and in a direction parallel to a plane including the coupled panels and perpendicular to the coupled edges;

wherein at least one lip is a lower lip, and the lower lip has a cross-section configuration uniform along the panel edge and has a non-uniform thickness between upper and under sides thereof; and wherein the lower lip is thicker at a proximal portion of the groove and becomes non-uniformly thinner in a direction extending distally away from said proximal portion over at least a portion of its length.

55. The floor covering panel according to any one of claims 15, 20, 45, 46, 47, 48, 49, 50, 53, or 54, wherein the coupling parts upon coupling are secured so they are coupled without play in the plane of the coupled panels.

56. The floor covering panel according to claim 54, wherein the locking protrusion on said tongue includes an apex in juxtaposed alignment with a cooperating recess formed in the lip when the coupling parts are coupled.

57. The floor covering panel according to claim 54, wherein at least a distal end portion of the lower lip is elastically bendable relative to a proximal end portion of the lower lip.

* * * * *

UNITED STATES PATENT AND TRADEMARK OFFICE
CERTIFICATE OF CORRECTION

| | |
|---|---|
| PATENT NO. | : 7,040,068 B2 |
| APPLICATION NO. | : 10/256183 |
| DATED | : May 9, 2006 |
| INVENTOR(S) | : Stefan Simon Gustaaf Moriau et al. |

It is certified that error appears in the above-identified patent and that said Letters Patent is hereby corrected as shown below:

Col. 14, line 61, should read: --8. The floor covering according to claim 7, said lip having a--

Signed and Sealed this

Seventeenth Day of October, 2006

JON W. DUDAS
*Director of the United States Patent and Trademark Office*